United States Patent
Takemoto et al.

(10) Patent No.: US 10,796,138 B2
(45) Date of Patent: Oct. 6, 2020

(54) INTRA-FACILITY ACTIVITY ANALYSIS DEVICE, INTRA-FACILITY ACTIVITY ANALYSIS SYSTEM, AND INTRA-FACILITY ACTIVITY ANALYSIS METHOD

(71) Applicant: PANASONIC INTELLECTUAL PROPERTY MANAGEMENT CO., LTD., Osaka (JP)

(72) Inventors: Yuichiro Takemoto, Kanagawa (JP); Takashi Fukatsu, Tokyo (JP); Yoshinobu Uno, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 16/086,499

(22) PCT Filed: Feb. 15, 2017

(86) PCT No.: PCT/JP2017/005484
§ 371 (c)(1),
(2) Date: Sep. 19, 2018

(87) PCT Pub. No.: WO2017/169225
PCT Pub. Date: Oct. 5, 2017

(65) Prior Publication Data
US 2019/0102612 A1    Apr. 4, 2019

(30) Foreign Application Priority Data
Mar. 31, 2016 (JP) ................. 2016-072290

(51) Int. Cl.
*G06K 9/00* (2006.01)
*H04N 7/18* (2006.01)
(Continued)

(52) U.S. Cl.
CPC ..... *G06K 9/00335* (2013.01); *G06K 9/00369* (2013.01); *G06K 9/00778* (2013.01);
(Continued)

(58) Field of Classification Search
CPC ......... G06K 9/00335; G06K 9/00778; G06K 9/00369; G06Q 10/063; G06Q 30/0201; H04N 7/181
See application file for complete search history.

(56) References Cited

U.S. PATENT DOCUMENTS

2003/0228128 A1* 12/2003 Taylor .................. G11B 27/107
386/226
2008/0114633 A1* 5/2008 Wolf .................. G06K 9/00771
705/7.29

(Continued)

FOREIGN PATENT DOCUMENTS

JP    11-175694    7/1999
JP    2009-134688    6/2009

(Continued)

OTHER PUBLICATIONS

International Search Report issued in International Patent Application No. PCT/JP2017/005484, dated Apr. 25, 2017.
U.S. Appl. No. 16/088,678 to Kazuhiko Iwai, filed Sep. 26, 2018.

*Primary Examiner* — Minjung Kim
(74) *Attorney, Agent, or Firm* — Greenblum & Bernstein, P.L.C.

(57) ABSTRACT

Activity information acquirer that acquires activity information representing an activity level of a moving object for each of a plurality of predetermined detection elements acquired through division performed on a captured image, a target area setter that sets a target area on a facility map image acquired by drawing a layout on the inside of the facility, an indexed information generator that generates indexed information acquired by indexing the activity state (Continued)

of the moving object in the target area on the basis of the activity information, an activity state display image generator that generates a digest image representing an overall activity state of the moving object in the target area on the basis of the indexed information, and an output information generator that generates output information which includes display information acquired by superimposing an activity state display image on the facility map image.

13 Claims, 15 Drawing Sheets

(51) Int. Cl.
*G06Q 10/06* (2012.01)
*G06Q 30/02* (2012.01)

(52) U.S. Cl.
CPC ....... *G06Q 10/063* (2013.01); *G06Q 30/0201* (2013.01); *H04N 7/181* (2013.01)

(56) References Cited

U.S. PATENT DOCUMENTS

| | | | |
|---|---|---|---|
| 2009/0134968 A1* | 5/2009 | Girgensohn | G08B 13/19613 340/3.1 |
| 2013/0091432 A1* | 4/2013 | Shet | G08B 13/19645 715/719 |
| 2013/0262451 A1 | 10/2013 | Ishikawa | |
| 2014/0222501 A1* | 8/2014 | Hirakawa | G06Q 30/0201 705/7.29 |
| 2014/0278742 A1* | 9/2014 | MacMillan | G06Q 30/0201 705/7.29 |
| 2015/0187088 A1 | 7/2015 | Iwai et al. | |
| 2015/0199698 A1 | 7/2015 | Yoshitake et al. | |
| 2016/0019664 A1* | 1/2016 | Hirakawa | G06Q 50/12 705/15 |
| 2017/0017840 A1* | 1/2017 | Higa | G06K 9/00201 |
| 2018/0211205 A1 | 7/2018 | Takemoto | |

FOREIGN PATENT DOCUMENTS

| | | |
|---|---|---|
| JP | 2011-233133 | 11/2011 |
| JP | 2015-125671 | 7/2015 |
| JP | 2015-133093 | 7/2015 |
| WO | 2012/073333 | 6/2012 |
| WO | 2016/038774 | 3/2016 |

\* cited by examiner

INTRA-FACILITY ACTIVITY ANALYSIS DEVICE, INTRA-FACILITY ACTIVITY ANALYSIS SYSTEM, AND INTRA-FACILITY ACTIVITY ANALYSIS METHOD

TECHNICAL FIELD

The present disclosure relates to an intra-facility activity analysis device, an intra-facility activity analysis system, and an intra-facility activity analysis method which perform analysis relevant to an activity state of a moving body and generates output information acquired by visualizing the activity state of the moving body on the basis of activity information generated from a captured image acquired by imaging an inside of a facility.

BACKGROUND ART

In a store, such as a convenience store, in a case where a remedy on store management, specifically, a remedy relevant to a method for reviewing a type of merchandise and exhibiting the merchandise for each department is taken into consideration on the basis of analysis relevant to a behavior of a customer on an inside of the store, improvement of a customer satisfaction degree and effective management of the store are realized, thereby being advantageous to improve sales and profits of the store. In contrast, in the store, such as the convenience store, a monitoring system, which is installed with a camera that photographs the inside of the store and which monitors a state on the inside of the store using a captured image of the camera, is widely spread. In a case where an information processing device is caused to perform analysis relevant to the behavior of the customer on the inside of the store using the captured image of the camera, it is possible to effectively perform a work for investigating the remedies on the management of the store.

As a technology for performing analysis relevant to a behavior of a person using the captured image of the camera, a technology (refer to PTL 1) is known for acquiring an activity level of the person in each location on an inside of a monitoring area on the basis of the captured image of the camera, and generating an activity map acquired by visualizing the activity level in the related art. In the technology, the activity map is displayed by being superimposed on a disposition map of the monitoring area in a state in which division is performed on the activity map using colors in a contour shape according to the activity level of the person, and, particularly, the activity level is counted for each time zone. Therefore, the activity map is displayed for each time zone.

CITATION LIST

Patent Literature

PTL 1: Japanese Patent Unexamined Publication No. 2009-134688

SUMMARY OF THE INVENTION

Meanwhile, in the technology according to the related art, it is possible to easily grasp an overall activity state of the person in the monitoring area for each time zone. However, since the activity map is displayed in a complicated shape, there is a problem in that it is not possible to immediately grasp the activity state of the person in a specific area which attracts user's attention, in the monitoring area. Particularly, although a store manager has a demand to grasp an activity trend of the customer in units of a department, which is classified on the basis of a type of the merchandise, a division of exhibition, or the like, it is not possible for the technology according to the related art to respond to the demand.

Here, a main object of the present disclosure is to provide an intra-facility activity analysis device, an intra-facility activity analysis system, and an intra-facility activity analysis method in which it is possible for a user to immediately grasp an activity state of a person in an area, which attracts the user's attention, within a facility.

According to an aspect of the present disclosure, there is provided an intra-facility activity analysis device, which performs analysis relevant to an activity state of a moving object on the basis of activity information generated from a captured image acquired by imaging an inside of a facility, and generates output information acquired by visualizing the activity state of the moving object, the intra-facility activity analysis device including: an activity information acquirer that acquires the activity information representing an activity level of the moving object for each of a plurality of predetermined detection elements acquired through division performed on the captured image; a target area setter that sets a target area on a facility map image acquired by drawing a layout on the inside of the facility; an indexed information generator that generates indexed information acquired by indexing the activity state of the moving object in the target area on the basis of the activity information; an activity state display image generator that generates an activity state display image representing overall activity state of the moving object in the target area on the basis of the indexed information; and an output information generator that generates the output information which includes display information acquired by superimposing the activity state display image on the facility map image.

In addition, according to another aspect of the present disclosure, there is provided an intra-facility activity analysis system, which performs analysis relevant to an activity state of a moving object on the basis of activity information generated from a captured image acquired by imaging an inside of a facility, and generates output information acquired by visualizing the activity state of the moving object, the intra-facility activity analysis system including: a camera that images the inside of the facility, generates the activity information representing an activity level of the moving object for each of a plurality of predetermined detection elements acquired through division performed on the captured image, and outputs the activity information; a server device that generates the output information by visualizing the activity information; and a user terminal device that displays a reading screen acquired by visualizing the activity information on the basis of the output information, in which the server device includes an activity information acquirer that acquires the activity information from the camera, a target area setter that sets a target area on a facility map image acquired by drawing a layout on the inside of the facility, an indexed information generator that generates indexed information acquired by indexing the activity state of the moving object in the target area on the basis of the activity information, an activity state display image generator that generates an activity state display image representing overall activity state of the moving object in the target area on the basis of the indexed information, and an output information generator that generates the output information which includes display information acquired by superimposing the activity state display image on the facility map image.

In addition, according to further another aspect of the present disclosure, there is provided an intra-facility activity analysis method causing an information processing device to perform a processing for performing analysis relevant to an activity state of a moving object on the basis of activity information generated from a captured image acquired by imaging an inside of a facility and generating output information acquired by visualizing the activity state of the moving object, the intra-facility activity analysis method including: acquiring the activity information representing an activity level of the moving object for each of a plurality of predetermined detection elements acquired through division performed on the captured image; setting a target area on a facility map image acquired by drawing a layout on the inside of the facility; generating indexed information acquired by indexing the activity state of the moving object in the target area on the basis of the activity information; generating an activity state display image representing overall activity state of the moving object in the target area on the basis of the indexed information; and generating the output information which includes display information acquired by superimposing the activity state display image on the facility map image.

According to the present disclosure, in a case where an area, which attracts user's attention, on the inside of the facility is set as the target area, the activity state display image representing the overall activity state of the moving object in the target area is displayed in a state of being superimposed on the facility map image. Therefore, it is possible for the user to immediately grasp the activity state of the moving object in the area, which attracts the user's attention, on the inside of the facility.

DESCRIPTION OF EMBODIMENTS

Figure 1:
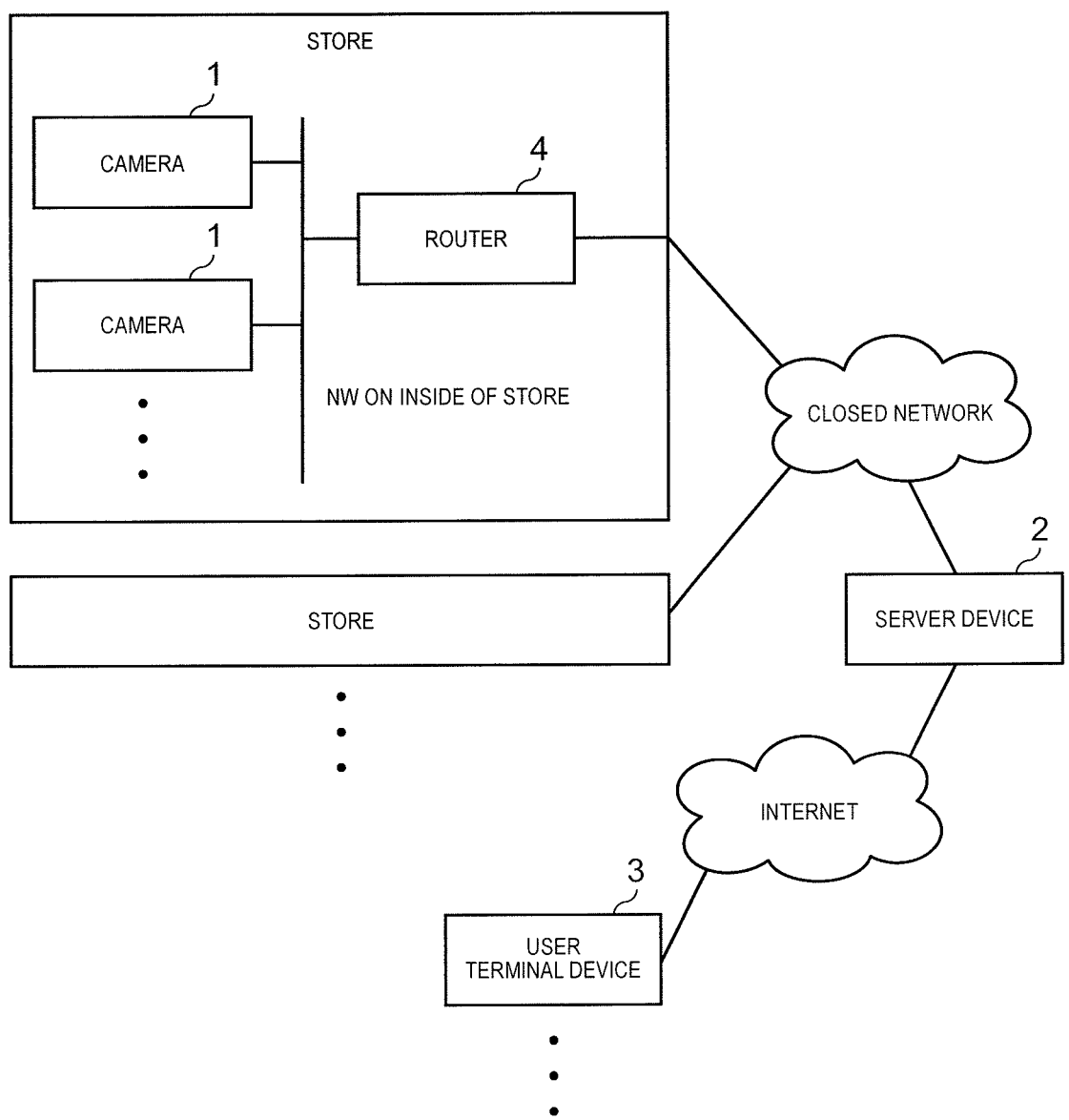
FIG. 1 is an overall configuration diagram illustrating an intra-facility activity analysis system according to a first embodiment.

According to a first disclosure provided to solve the problems, there is provided an intra-facility activity analysis device, which performs analysis relevant to an activity state of a moving object on the basis of activity information generated from a captured image acquired by imaging an inside of a facility, and generates output information acquired by visualizing the activity state of the moving object, the intra-facility activity analysis device including: an activity information acquirer that acquires the activity information representing an activity level of the moving object for each of a plurality of predetermined detection elements acquired through division performed on the captured image; a target area setter that sets a target area on a facility map image acquired by drawing a layout on the inside of the facility; an indexed information generator that generates indexed information acquired by indexing the activity state of the moving object in the target area on the basis of the activity information; an activity state display image generator that generates an activity state display image representing overall activity state of the moving object in the target area on the basis of the indexed information; and an output information generator that generates the output information which includes display information acquired by superimposing the activity state display image on the facility map image.

According to the first disclosure, in a case where an area, which attracts user's attention, on the inside of the facility is set as the target area, the activity state display image representing the overall activity state of the moving object in the target area is displayed by being superimposed on the facility map image. Therefore, it is possible for the user to immediately grasp the activity state of the moving object in the area, which attracts the user's attention, on the inside of the facility.

In addition, according to a second disclosure, the target area setter may set the target area to an arbitrary shape designated by a user according to an input operation of the user.

According to the second disclosure, it is possible for the user to freely designate a shape of the target area.

In addition, according to a third disclosure, the activity information may be related to at least any one of the number of staying people, which is the number of people who stay in the target area, and stay time which is time during which the person stayed in the target area.

Accordingly, since the activity state display image representing the number of staying people and the stay time is displayed, it is possible for the user to immediately grasp the number of staying people and the stay time in the area, which attracts the user's attention, on the inside of the facility.

In addition, according to a fourth disclosure, the activity state display image generator may generate a densified activity state display image representing the activity state of the moving object in each location on the inside of the target area on the basis of the activity information according to an operation for designating densification of the activity state display image by the user, and the output information generator may generate the display information acquired by superimposing the densified activity state display image on the facility map image.

Accordingly, since the densified activity state display image is displayed depending on needs of the user, it is possible for the user to grasp the activity state of the moving object in the target area in detail.

In addition, according to a fifth disclosure, the output information generator may generate the output information relevant to an activity state display screen that includes a map display unit, which displays the activity state display image superimposed on the facility map image, and an operation unit, which causes the user to designate an observation period of the activity information, and the activity information acquirer may acquire the activity information which is generated during the observation period designated by the user.

Accordingly, since it is possible for the user to freely designate the activity information observation period, it is possible to display the activity state display image representing the activity state of the moving object during a necessary period.

In addition, according to a sixth disclosure, the intra-facility activity analysis device may further include a statistical information generator that generates statistical information relevant to a state on the inside of the facility, and the output information generator may generate the output information that includes the display information, which is acquired by superimposing the activity state display image on the facility map image, and the display information which causes the statistical information relevant to the activity state display image to be displayed as relevant information.

Accordingly, since the statistical information relevant to the activity state display image is displayed as the relevant information, it is possible for the user to grasp various states on the inside of the facility from various points of view.

In addition, according to a seventh disclosure, the output information generator may generate the output information relevant to the activity state display screen that includes the map display unit, which displays the activity state display image superimposed on the facility map image, and a selector, which causes a display item of the relevant information to be selected, and generates the output information relevant to a relevant information display screen that displays the relevant information of the selected display item according to an operation for selecting the display item in the selector by the user.

Accordingly, it is possible for the user to freely select the relevant information which is displayed on the relevant information display screen.

In addition, according to an eighth disclosure, the intra-facility activity analysis device may further include a camera image acquirer that acquires a camera image acquired by imaging the inside of the facility, and the output information generator may generate the display information in which a plurality of the camera images relevant to the target area are disposed in time series.

Accordingly, since the camera images are displayed on the relevant information display screen, it is possible to observe an actual state on the inside of the facility relevant to the target area.

In addition, according to a ninth disclosure, the output information generator may generate the output information relevant to the relevant information display screen, which displays the plurality of camera images disposed in time series to be selectable, and enlarges and displays the selected camera image on the relevant information display screen according to an operation for selecting the camera image on the relevant information display screen by the user.

Accordingly, in a case where the camera image, which attracts attention, is enlarged and displayed, it is possible to observe the actual state on the inside of the facility in detail.

In addition, according to a tenth disclosure, the intra-facility activity analysis device may further include an exhibition state determinator that determines a merchandise exhibition state in an exhibition area relevant to the target area in a store as the facility on the basis of the camera image, and the output information generator may generate the display information which displays a graph representing the merchandise exhibition state in the exhibition area on the basis of a result of determination performed by the exhibition state determinator.

Accordingly, since the graph representing the merchandise exhibition state is displayed, it is possible for the user to grasp the merchandise exhibition state in the exhibition area relevant to the target area.

In addition, according to an eleventh disclosure, the output information generator may generate the display information which displays the graph representing the merchandise exhibition state in the exhibition area and the camera image relevant to the target area in parallel.

Accordingly, it is possible for the user to grasp an actual merchandise exhibition state in the exhibition area relevant to the target area using the camera image relevant to the target area.

In addition, according to a twelfth disclosure, there is provided an intra-facility activity analysis system, which performs analysis relevant to an activity state of a moving object on the basis of activity information generated from a captured image acquired by imaging an inside of a facility, and generates output information acquired by visualizing the activity state of the moving object, the intra-facility activity analysis system including: a camera that images the inside of the facility, generates the activity information representing an activity level of the moving object for each of a plurality of predetermined detection elements acquired through division performed on the captured image, and outputs the activity information; a server device that generates the output information by visualizing the activity information; and a user terminal device that displays a reading screen acquired by visualizing the activity information on the basis of the output information, in which the server device includes an activity information acquirer that acquires the activity information from the camera, a target area setter that sets a target area on a facility map image acquired by drawing a layout on the inside of the facility, an indexed information generator that generates indexed information acquired by indexing the activity state of the moving object in the target area on the basis of the activity information, an activity state display image generator that generates an activity state display image representing overall activity state of the moving object in the target area on the basis of the indexed information, and an output information generator that generates the output information which includes display information acquired by superimposing the activity state display image on the facility map image.

Accordingly, similar to the first disclosure, it is possible for the user to immediately grasp the activity state of the person in the area, which attracts the user's attention, on the inside of the facility.

In addition, according to a thirteenth disclosure, there is provided an intra-facility activity analysis method causing an information processing device to perform a processing for performing analysis relevant to an activity state of a moving object on the basis of activity information generated from a captured image acquired by imaging an inside of a facility and generating output information acquired by visualizing the activity state of the moving object, the intra-facility activity analysis method including: acquiring the activity information representing an activity level of the moving object for each of a plurality of predetermined detection elements acquired through division performed on the captured image; setting a target area on a facility map image acquired by drawing a layout on the inside of the facility; generating indexed information acquired by indexing the activity state of the moving object in the target area on the basis of the activity information; generating an activity state display image representing overall activity state of the moving object in the target area on the basis of the indexed information; and generating the output information which includes display information acquired by superimposing the activity state display image on the facility map image.

According to the thirteenth disclosure, similar to the first disclosure, it is possible for the user to immediately grasp the activity state of the person in an area, which attracts user's attention, on the inside of the facility.

Hereinafter, embodiments will be described with reference to the accompanying drawings.

First Embodiment

FIG. 1 is an overall configuration diagram illustrating an intra-facility activity analysis system according to a first embodiment.

The intra-facility activity analysis system is constructed by targeting a retail chain store, such as a convenience store, and includes cameras 1 that are provided for each of a plurality of stores (facilities), server device (intra-facility activity analysis device) 2, and user terminal device 3.

Cameras 1 are installed in proper locations on an inside of the store, and image the inside of the store. Cameras 1 are connected to server device 2 through an in-store network or a closed network such as router 4 and a Virtual Local Area Network (VLAN). In addition, in each camera 1, an image processing for removing a person from an image acquired by imaging the inside of the store is performed, and a camera image (a processed image) acquired through the image processing is output from camera 1.

Server device 2 performs analysis relevant to an activity state of a customer on the inside of the store. Server device 2 receives the camera image or the like which is transmitted from camera 1 installed on the inside of the store. In addition, server device 2 is connected to user terminal device 3 through the Internet, generates an analysis result information reading screen and delivers the analysis result information reading screen to user terminal device 3, and acquires information which is input by the user on the reading screen.

User terminal device 3 is used for a store-side user, for example, a manger or a headquarter-side user, for example, a supervisor who provides a direction or a guidance with respect to each store in a region of responsibility to read the analysis result information, which is generated in server device 2, and includes a smart phone, a tablet terminal, or a PC. User terminal device 3 displays the analysis result information reading screen delivered from server device 2 is displayed.

Figure 2:
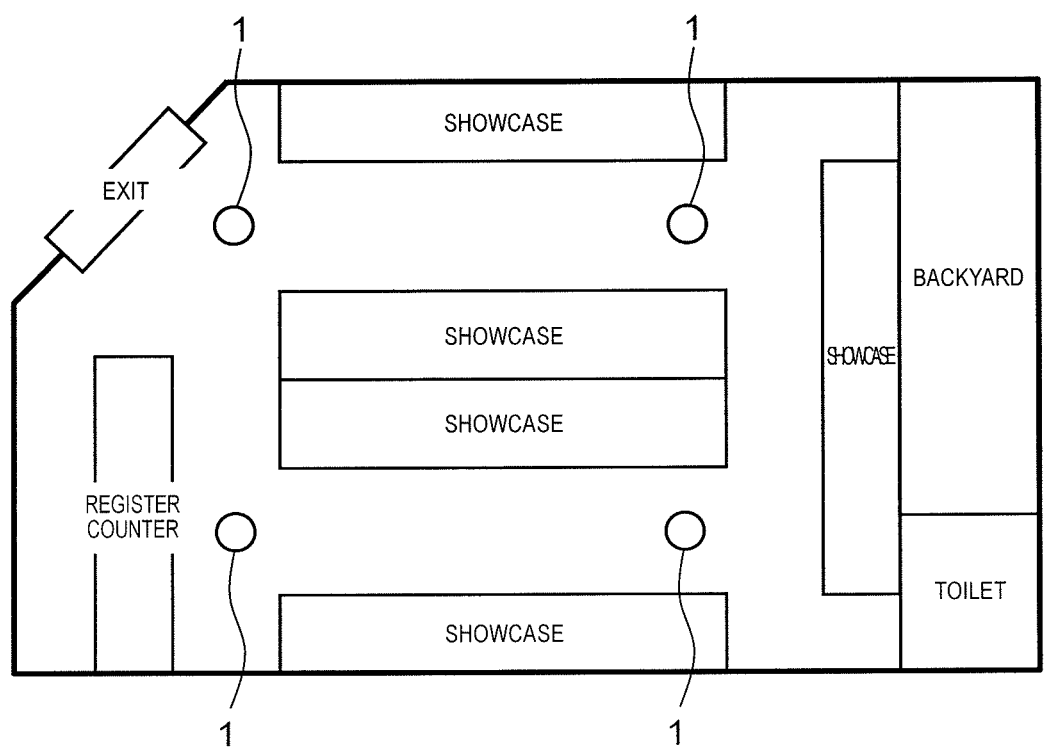
FIG. 2 is a store plan diagram illustrating a layout of a store and an installation state of cameras 1.

Subsequently, a layout of the store and an installation state of cameras 1 will be described. FIG. 2 is a store plan diagram illustrating the layout of the store and the installation state of cameras 1.

The store is provided with an exit, showcases, a register counter, and the like. The showcases are installed through classification performed according to division (type) performed on merchandise such as fast food (FF), cooked rice (merchandise such as a rice ball, a lunch box, or sushi), bakery, dessert, drinks, processed food, miscellaneous goods, fresh food, magazines, and newspapers. The customer enters the store from the exit, moves inside of the store through a passage between the showcases. In a case where the customer finds desired merchandise, the customer heads to the register counter with the merchandise, pays for the merchandise (price settlement) at the register counter, and leaves the store from the exit.

In addition, in the store, plurality of cameras 1, which photograph the department, are installed. Cameras 1 are installed in proper locations at a ceiling on the inside of the store. Particularly, in an example of FIG. 2, omnidirectional cameras, which each has a 360-degree photographing range using a fisheye lens, are applied to cameras 1. With cameras 1, it is possible to photograph the merchandise exhibited in the showcase or the like of the department, the customer who stays in the department, or the like.

Meanwhile, in camera 1, four target areas are set on an image area which does not include a central part of an fisheye image, videos in the four target areas are cut from a fisheye video, and thus it is possible to output a 1 image PTZ image, a double-panorama image, and a single-panorama image in addition to a 4 image PTZ image which is acquired by performing distortion correction with respect to the videos in the four target areas. The 1 image PTZ image is acquired by setting one target area on the fisheye image, cutting an image of the target area from the fisheye image, and performing the distortion correction with respect to the image. The double panorama image is acquired by cutting an image in a state in which a ring-shaped image area, other than the central part of the fisheye image, is divided into two parts, and performing the distortion correction on the image. The single panorama image is acquired by cutting a video, other than arch-shaped image areas which are in symmetry locations with respect to the central part of the fisheye video, from the fisheye image, and performing the distortion correction on the image.

Figure 3A:
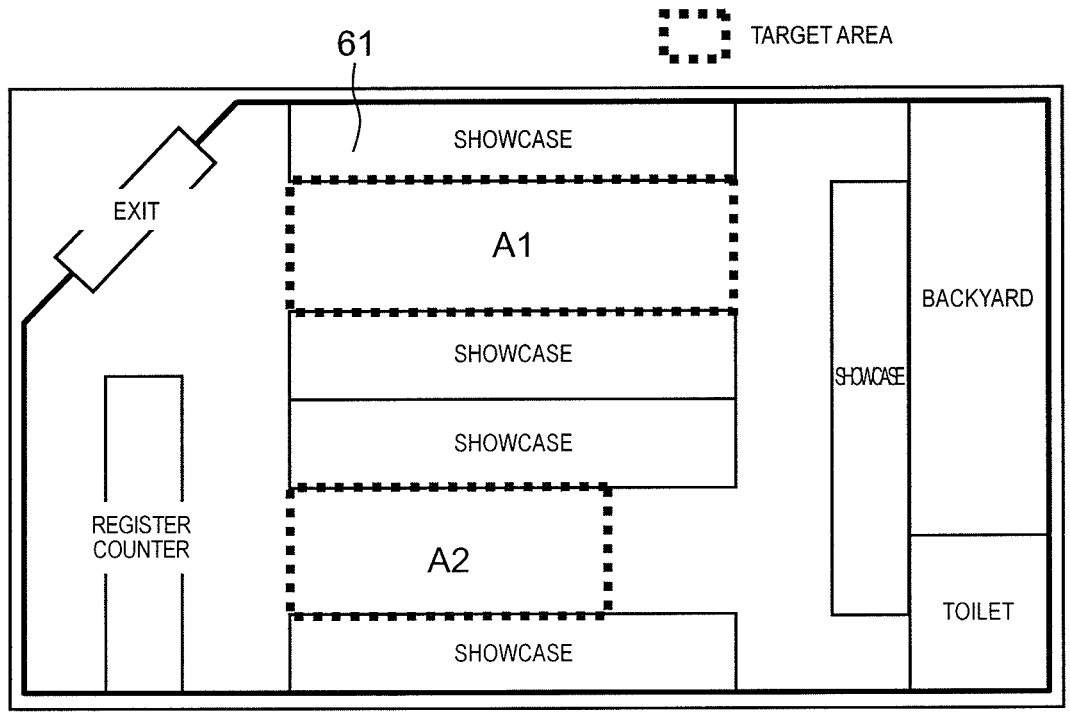
FIG. 3A is an explanatory diagram illustrating a target area which is set on a store map image and a state in which a digest image of the target area is superimposed on the store map image.
Figure 3B:
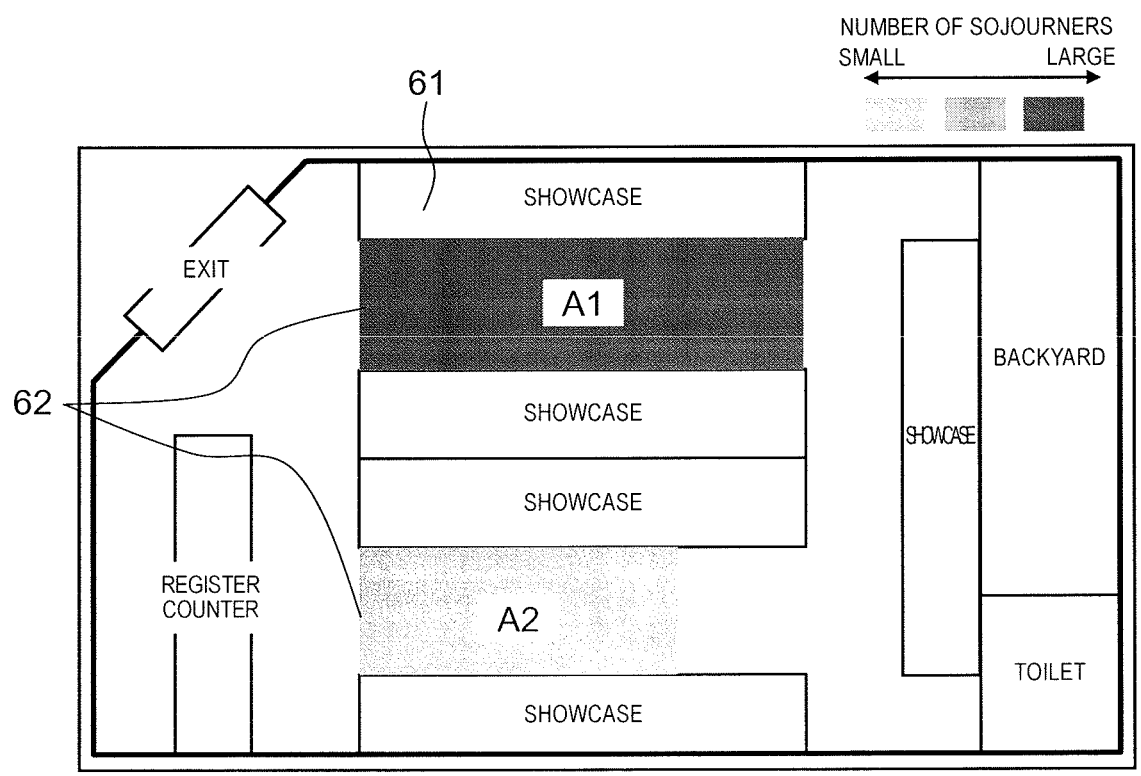
FIG. 3B is an explanatory diagram illustrating the target area which is set on the store map image and a state in which the digest image of the target area is superimposed on the store map image.

Subsequently, the target area and a digest image will be described. FIG. 3A is an explanatory diagram illustrating the target area which is set on a store map image. FIG. 3B is an explanatory diagram illustrating a state in which the digest image of the target area is displayed by being superimposed on the store map image.

Server device 2 sets the target area on store map image (facility map image) 61 which is acquired by drawing the layout of the store, as illustrated in FIG. 3A, on the basis of an operational input of the user in user terminal device 3. In an example illustrated in FIG. 3A, two target areas A1 and A2 are set. The target area is set to a specific area, which particularly attracts user (store manager or the like)'s attention, on the inside of the store, for example, an area which is in contact with an exhibition area (showcase or the like), in which the merchandise is exhibited, in order to check a customer attracting state of specific merchandise (new merchandise, seasonal merchandise, the lunch box, drinks, or the like).

Meanwhile, in store map image 61, components, such as the exit, the showcases, and the register counter which are installed in the store, of the store are drawn, and thus it is possible for the user to grasp dispositions of the components of the store.

In addition, camera 1 acquires activity information (the number of staying people and stay time) representing an activity level of a person in each location of a captured image on the basis of the captured image acquired by imaging the inside of the store. The activity information is transmitted from camera 1 to server device 2. Server device 2 generates screen information, in which digest image (activity state display image) 62 representing an overall activity state of the person in the target area is displayed by being superimposed on store map image 61, as illustrated in FIG. 3B, on the basis of the activity information. Digest image 62 represents the activity information with a change in a display color.

Meanwhile, in an example illustrated in FIG. 3B, digest image 62 relevant to the number of staying people is displayed as the activity information. However, it is also possible to display digest image relevant to the stay time in the same manner.

In addition, in the example illustrated in FIG. 3B, the activity information (the number of staying people and the stay time) is expressed with the change in the display color of digest image 62. However, the activity information may be expressed by changing a display shape of the other display element (for example, a painting pattern or the like). In addition, the number of staying people and the stay time may be simultaneously expressed in one digest image 62 by assigning different display elements to the number of staying people and the stay time.

Figure 4:
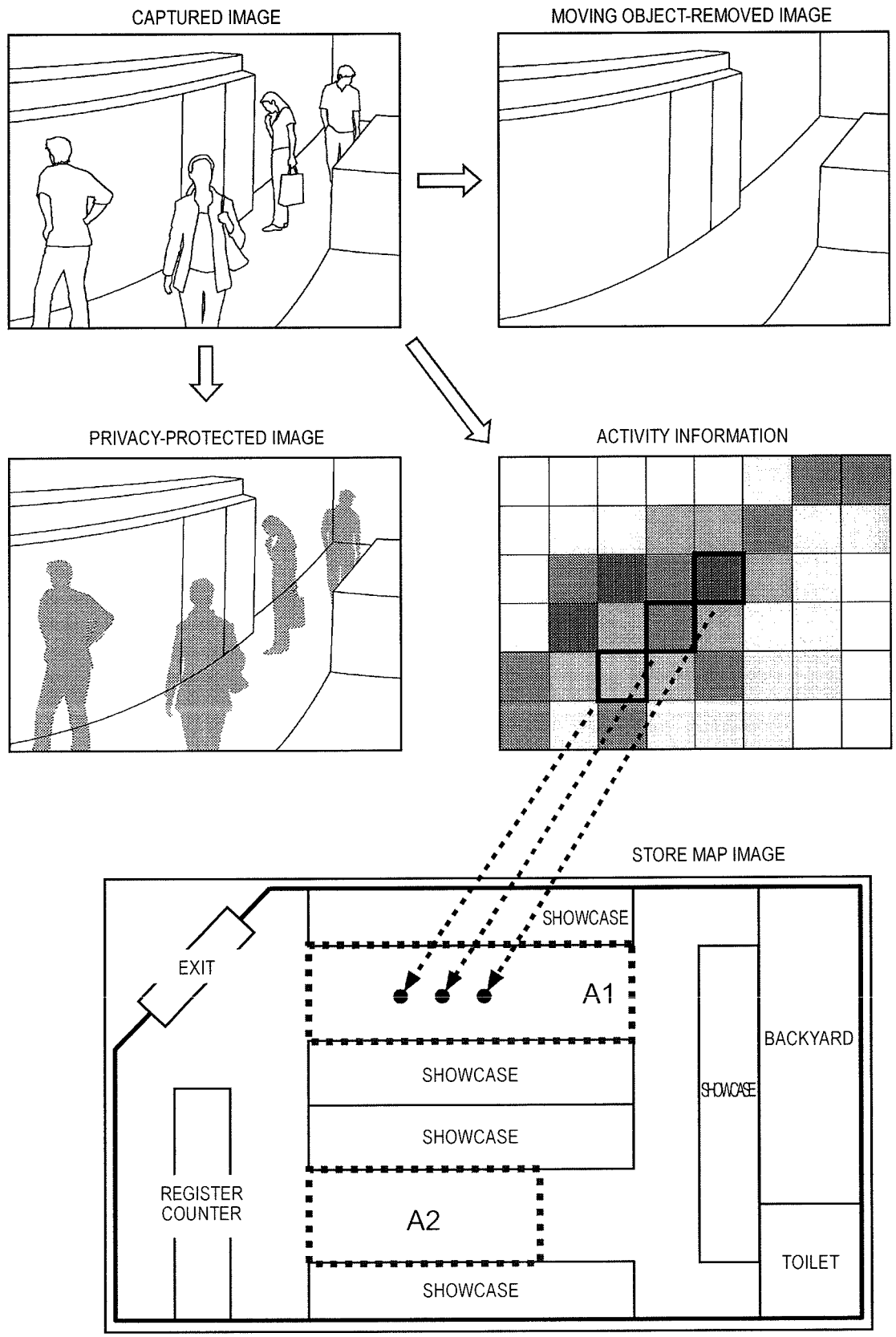
FIG. 4 is an explanatory diagram illustrating an outline of a processing which is performed by cameras 1 and server device 2.

Subsequently, an outline of a processing performed in camera 1 and server device 2 will be described. FIG. 4 is an explanatory diagram illustrating the outline of the processing performed in camera 1 and server device 2.

Camera 1 generates a moving object-removed image through an image processing for removing a moving object, such as the person, from the captured image. In addition, camera 1 generates a privacy-protected image through a privacy mask processing, that is, an image processing for changing an area of the person in the captured image into a mask image. In addition, camera 1 generates the activity information (the number of staying people and the stay time) representing the activity level of the person for each cell (detection element) acquired by dividing the captured image into lattice shapes. Meanwhile, in an example illustrated in FIG. 4, the activity information for each cell is represented with contrasting density of the display color by targeting one image of the 4 image PTZ image.

Here, the activity information for each cell is acquired for each predetermined unit time and the activity information for each unit time is counted during an observation period (for example, during 15 minutes or 1 hour) designated by the user. Therefore, it is possible to acquire the activity information of an arbitrary observation period corresponding to an integral multiple of unit time.

Server device 2 extracts a cell located in the target area from among cells which are set on the captured image. Here, mapping information relevant to a corresponding relationship between each location on the store map image and each location on the camera image is used, and thus it is possible to map each cell, which is set on the captured image, on the store map image on the basis of the mapping information.

Meanwhile, the mapping information may be set in such a way that a photographing range of each camera image is superimposed on the store map image using simulation software or the like by the user. However, the mapping information may be acquired through the image processing (projective transformation or the like).

Subsequently, server device 2 generates indexed information acquired by indexing (integrating) an activity state of the person in the target area on the basis of the activity information for each extracted cell. In indexing, a representative value (an average value, a most frequent value, a medium value, or the like) representing the overall activity state of the person in the target area is acquired by performing a statistical processing on the activity information of each cell. In addition, in the indexing, the indexed information of the target area is acquired by ranking (3 rankings, that is, large, small, and normal ranking, or the like) the acquired representative value using a predetermined threshold value.

In a case where the indexed information of the target area is acquired in this manner, digest image (activity state display image) 62 representing the overall activity state of the person in the target area is generated, as illustrated in FIG. 3B. Here, the display color of digest image 62 is determined on the basis of the indexed information of the target area.

Meanwhile, in the embodiment, heat map image 161 (refer to FIG. 15), which is acquired by densifying digest image 62, is displayed. In this case, the activity information may be generated in units of a sub cell, which is acquired by densifying each of the cells which are set on the captured image. In this case, on the basis of the mapping information, each sub cell which is set on the captured image may be mapped on the store map image and the sub cell located in the target area may be extracted.

Figure 5:
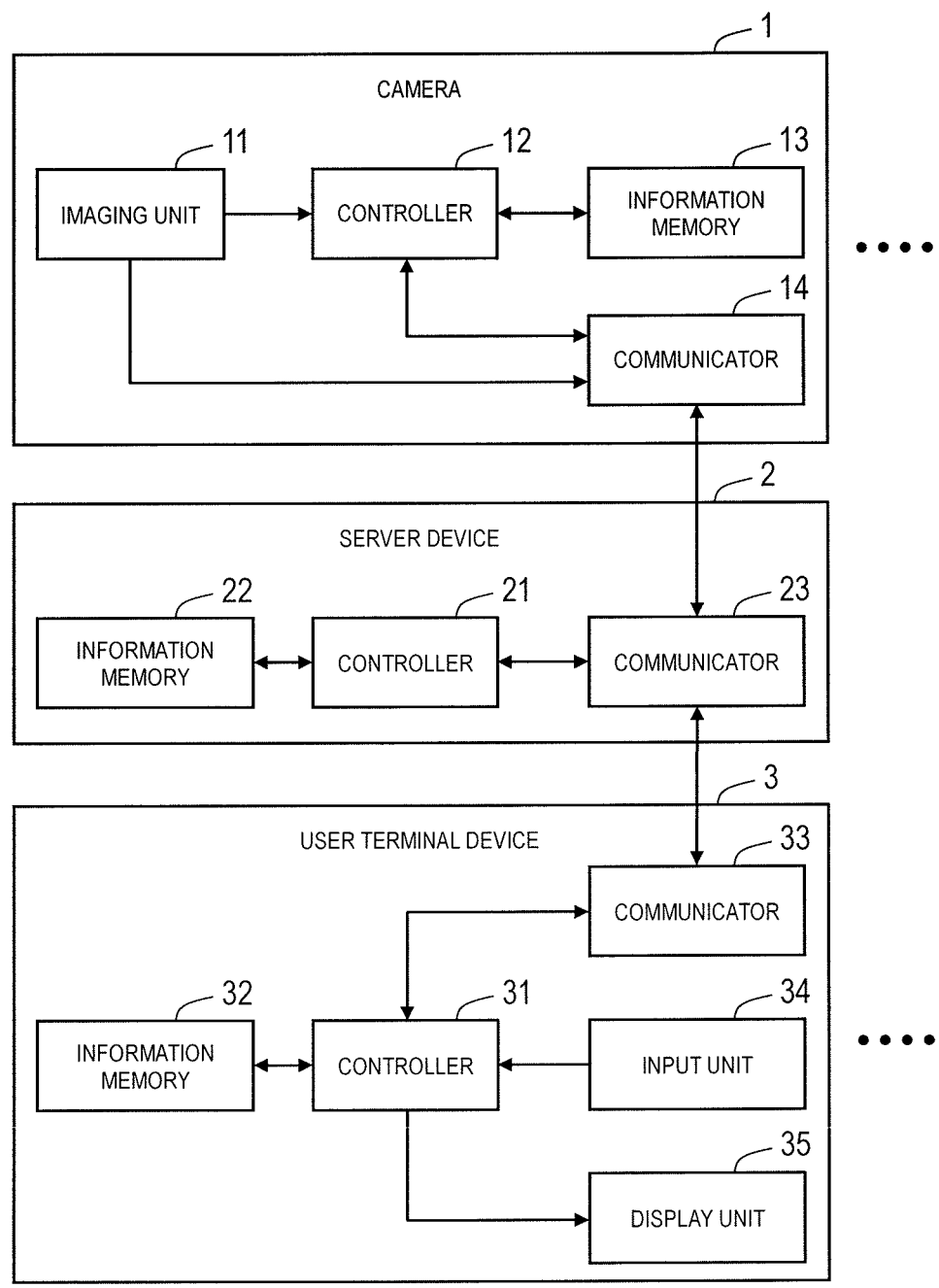
FIG. 5 is a block diagram illustrating a hardware configuration of camera 1, server device 2, and user terminal device 3.

Subsequently, a schematic configuration of camera 1, server device 2, and user terminal device 3 will be described. FIG. 5 is a block diagram illustrating a hardware configuration of camera 1, server device 2, and user terminal device 3.

Camera 1 includes imaging unit 11, controller 12, information memory 13, and communicator 14.

Imaging unit 11 includes an image sensor, and sequentially outputs captured images (frames), so-called moving images, which are continuative in time. Controller 12 performs the image processing for removing the moving object, such as the person, with respect to the captured image and the image processing for changing the area of the person in the captured image into the mask image, and outputs the moving object-removed image, which is generated through the image processing, or the privacy-protected image as the camera image. Information memory 13 stores a program, which is executed by a processor included in controller 12, and the captured image which is output from imaging unit 11. Communicator 14 performs communication between camera 1 and server device 2, and transmits the camera image, which is output from controller 12, to server device 2 through a network.

Server device 2 includes controller 21, information memory 22, and communicator 23.

Communicator 23 performs communication between camera 1 and user terminal device 3, receives the camera image, which is transmitted from camera 1, receives user setting information, which is transmitted from user terminal device 3, and delivers the analysis result information reading screen to user terminal device 3. Information memory 22 stores the camera image, which is received by communicator 23, a program, which is executed by a processor included in controller 21, and the like. Controller 21 performs analysis relevant to an activity state of a customer on the inside of the store, and generates the analysis result information reading screen to be delivered to user terminal device 3.

User terminal device 3 includes controller 31, information memory 32, communicator 33, input unit 34, and display unit 35.

Input unit 34 is used for the user to input various pieces of setting information. Display unit 35 displays the analysis result information reading screen on the basis of the screen information which is transmitted from server device 2. It is possible to form input unit 34 and display unit 35 using a touch panel display. Communicator 33 performs communication between user terminal device 3 and server device 2, transmits the user setting information, which is input by input unit 34, to server device 2, and receives the screen information which is transmitted from server device 2. Controller 31 controls each of the units of user terminal device 3. Information memory 32 stores a program which is executed by the processor included in the controller 31.

Figure 6:
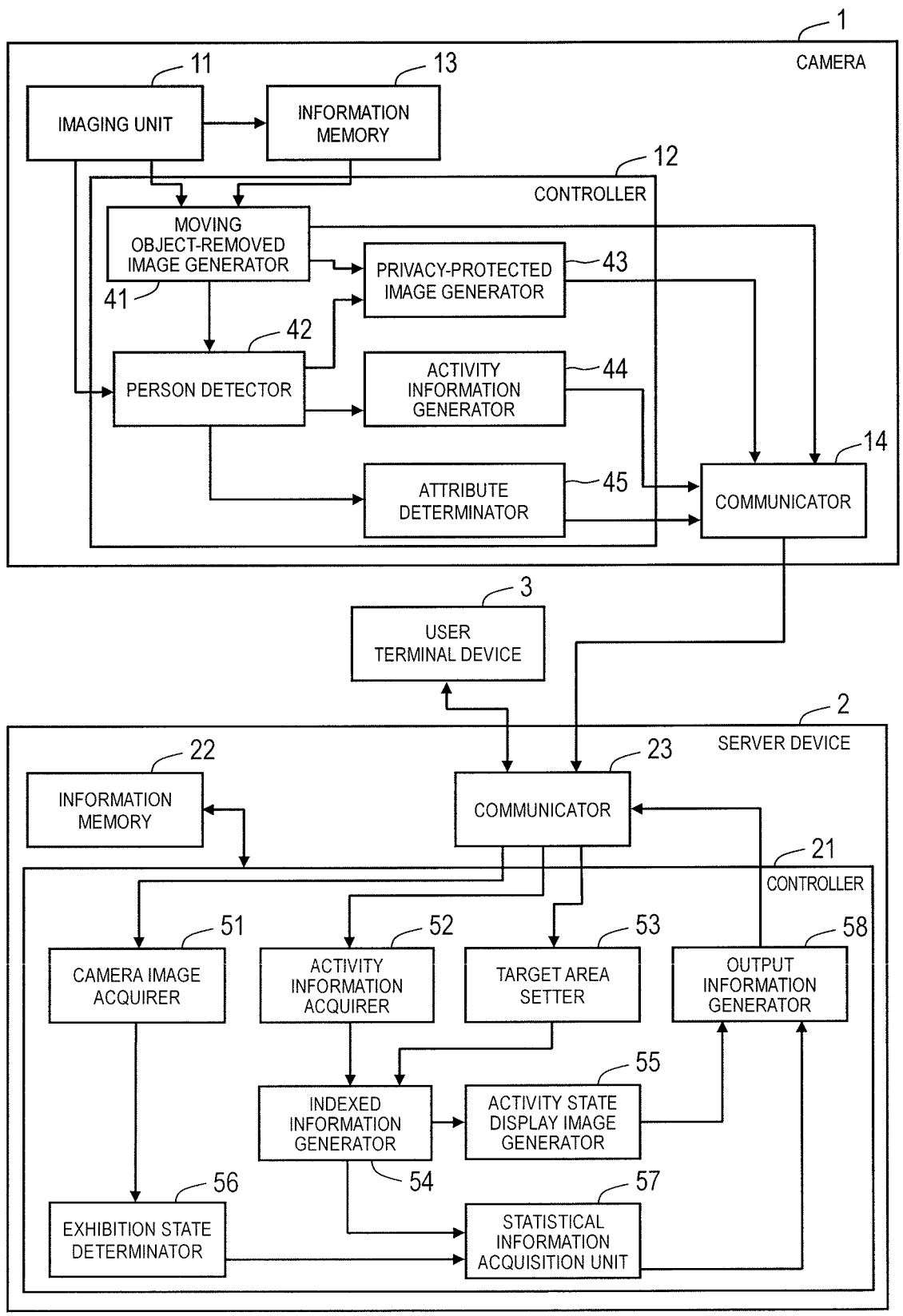
FIG. 6 is a functional block diagram illustrating camera 1 and server device 2.

Subsequently, a functional configuration of camera 1 and server device 2 will be described. FIG. 6 is a block diagram illustrating the functional configuration of camera 1 and server device 2.

Controller 12 of camera 1 includes moving object-removed image generator 41, person detector 42, privacy-protected image generator 43, activity information generator 44, and attribute determinator 45. Each of the units of controller 12 is realized by causing the processor included in controller 12 to execute an intra-facility activity analysis program (instruction) which is stored in information memory 13.

On the basis of a plurality of captured images (frames) during a predetermined learning period, moving object-removed image generator 41 generates the moving object-removed image (refer to FIG. 4) acquired by removing the moving object from the captured image. Specifically, in a case where the captured images, which are output from imaging unit 11 and which are continuative in time, are sequentially input to moving object-removed image generator 41, moving object-removed image generator 41 generates the moving object-removed image (background image) by acquiring governing image information (color information in a prevailing condition) in a pixel unit on the basis of the plurality of captured images during an immediately before predetermined sampling period. Furthermore, in a case where the governing image information is updated whenever the captured images are input, it is possible to acquire a newest moving object-removed image. A well-known background image generation technology may be used to generate the moving object-removed image.

Person detector 42 compares the moving object-removed image (background image) acquired in moving object-removed image generator 41 with a current captured image output from imaging unit 11, and specifies the image area of the moving object in the captured image based on difference between the moving object-removed image and the current captured image (moving object detection). Furthermore, in a case where a Ω shape, which includes a face, a head, and a shoulder of a person, is detected in the image area of the moving object, the moving object is determined to be the person (person detection). A well-known technology may be used to detect the moving object and the person.

In addition, person detector 42 acquires a moving line for each person on the basis of a result of detection of the person. In this processing, the moving line may be generated in such a way as to acquire coordinates of a central point of the person and to connect the central point. Meanwhile, information acquired in person detector 42 includes time information relevant to detection time for each person, which is acquired based on time in which the captured image, in which the person is detected, is photographed.

Attribute determinator 45 performs a processing for determining an attribute (gender, age, or the like) for each person detected by person detector 42. Meanwhile, a well-known technology may be used to determine the attribute.

Privacy-protected image generator 43 generates the privacy-protected image (refer to FIG. 4) acquired by changing the area of the person in the captured image, which is output from the imaging unit 11, into the mask image on the basis of the result of the detection performed by person detector 42.

In a case where the privacy-protected image is generated, first, the mask image, which has contours corresponding to the image area of the person, is generated based on positional information of the person in the image area acquired in person detector 42. Furthermore, the privacy-protected image is generated in superimposing the mask image on the moving object-removed image acquired in moving object-removed image generator 41. The mask image is acquired by filling the inside of the contours of the person with a predetermined color (for example, a blue color), and has permeability. In the privacy-protected image, a state in which background image is viewed through a part of the mask image is acquired.

Activity information generator 44 acquires the activity information representing the activity level of the person for each cell (detection element) in a lattice shape acquired through division performed on the captured image. In the embodiment, on the basis of the moving line information, which is acquired in person detector 42, for each person, the number of staying people and the stay time are acquired as the activity information representing the activity level of the person.

In a case where the number of staying people is acquired, the number of moving lines of each person who passes through each cell is counted, and thus the number of staying people of each cell is acquired. In a case where the stay time is acquired, first, sojourn time (entry time and exit time with respect to the cell) for each person is acquired by targeting the moving line of each person who passes through each cell, subsequently, the stay time for each person is acquired based on the sojourn time for each person, subsequently, an averaging processing (statistical processing) is performed with respect to the stay time for each person, and thus the stay time for each cell is acquired.

Meanwhile, activity information generator 44 may acquire the activity information of each cell (the number of staying people and the stay time) for each unit time, may integrate the activity information for each unit time during predetermined observation period (for example, 1 hour) through the statistical processing (adding, averaging, or the like), and may acquire the activity information of each cell during the observation period. In addition, in a case where the activity information of each cell during the observation period is generated for each person, it is possible to prevent the person from being duplicated in a case where the activity information is indexed (integrated) in entirety of the target area in server device 2.

The moving object-removed image, which is generated in moving object-removed image generator 41, and the privacy-protected image, which is acquired in privacy-protected image generator 43, are transmitted as the camera image from communicator 14 to server device 2 at a predetermined unit time interval (for example, at 15-minute interval). Specifically, server device 2 periodically performs an image transmission demand with respect to camera 1 at predetermined timing (for example, at 15-minute interval). Communicator 14 of camera 1 transmits the camera image at that time according to the image transmission demand from server device 2.

In addition, the activity information, which is acquired in activity information generator 44, and attribute information, which is acquired in attribute determinator 45, are also transmitted from communicator 14 to server device 2. The activity information and the attribute information may be transmitted to server device 2 at the same timing as the camera image (the moving object-removed image and the privacy-protected image). However, the activity information and the attribute information may be transmitted to server device 2 at different timing from the camera image.

Meanwhile, in a case where the activity information is transmitted at the same timing as the camera image, the activity information observation period may coincide with the transmission interval (for example, at 15-minute interval). In this case, in a case where the activity information corresponding to the observation period which is longer than the transmission interval is acquired, the activity information acquired from camera 1 may be aggregated. For example, in a case where the transmission interval is the 15-minute interval and the activity information for 15 minutes is added until it's been 1 hour, it is possible to acquire the activity information for 1 hour.

In addition, the moving object-removed image and the mask image information (the mask image or the positional information of the person in the image area) may be transmitted from camera 1 to server device 2, and the privacy-protected image may be generated in server device 2.

Controller 21 of the server device includes camera image acquirer 51, activity information acquirer 52, target area setter 53, indexed information generator 54, activity state display image generator 55, exhibition state determinator 56, statistical information generator 57, and output information generator 58. Each of the units of controller 21 is realized by causing the processor included in controller 21 to execute an intra-facility activity analysis program (instruction) stored in information memory 22.

Camera image acquirer 51 acquires the camera image (the moving object-removed image and the privacy-protected image) which is periodically (for example, 15-minute interval) transmitted from camera 1 and is received by communicator 23. The camera image, which is acquired in camera image acquirer 51, is stored in information memory 22.

Activity information acquirer 52 acquires the activity information which is transmitted from camera 1 and is received in communicator 23. The activity information, which is acquired in activity information acquirer 52, is stored in information memory 22.

Target area setter 53 performs a processing for setting the target area (refer to FIG. 3A) on store map image 61 according to an input operation of the user in user terminal device 3. Here, an area setting screen, on which store map image 61 is displayed, may be displayed on user terminal device 3, and the location of the target area may be input on the area setting screen by the user.

Indexed information generator 54 generates indexed information, in which the activity state of the person in the target area that is set in target area setter 53 is indexed, on the basis of the activity information (the number of staying people and the stay time) which is acquired in activity information acquirer 52. In the embodiment, the activity information for each cell is acquired from camera 1 during the predetermined observation period. In addition, information memory 22 stores the mapping information relevant to the corresponding relationship between each location on the camera image and each location on the store map image. Indexed information generator 54 extracts a cell located in the target area among the cells of the camera image on the basis of the mapping information, performs the statistical processing on the extracted activity information of each cell, and generates the indexed information acquired by targeting the whole target area. The average value or the most frequent value of the activity information of each cell may be acquired as the indexed information.

Activity state display image generator 55 generates the digest image (activity state display image) 62, which indicates the overall activity state of the person in the target area, on the basis of the indexed information, which is generated by indexed information generator 54, of the target area. Here, the display color of digest image 62 is determined on the basis of the indexed information of the target area.

Exhibition state determinator 56 determines a merchandise exhibition state in the exhibition area (showcase or the like) relevant to the target area on the basis of the moving object-removed image acquired in camera image acquirer 51. In the embodiment, a state monitoring area is set on the camera image, and a merchandise exhibition quantity, specifically, a ratio of an exhibition quantity in a designated time to a maximum exhibition quantity in a state in which the merchandise is maximally exhibited is acquired by targeting the state monitoring area. In addition, a quality of the merchandise exhibition state is determined using an evaluation index, such as a volume degree representing a degree in which the merchandise is gathered and exhibited in bulk, an alignment degree representing a degree in which the merchandise is aligned and exhibited in a horizontal direction, or a face-up degree representing a degree in which the merchandise is arranged and exhibited in a front location of the state monitoring area, as the standard.

Statistical information generator 57 generates statistical information used to generate graphs targeting the whole store, specifically, respective graphs of a clientele, the number of store visitors, the stay time, and the exhibition quantity, and a table (refer to FIG. 8) representing a result of evaluation of the exhibition state. In addition, statistical information generator 57 generates the statistical information used to generate a graph targeting the target area, specifically, a time-series heat map (refer to FIG. 9), a histogram (refer to FIG. 10), a graph (refer to FIG. 11), and a scatter diagram (refer to FIG. 14) representing a correlation.

Output information generator 58 generates display information used to superimpose the digest image, which is acquired in activity state display image generator 55, on the store map image. In addition, in the embodiment, on the basis of the statistical information acquired in statistical information generator 57, display information, which is relevant to a total management screen (refer to FIG. 7), a map display screen (refer to FIG. 8 and FIG. 15), and a relevant information display screen (refer to FIG. 9 to FIG. 14), is generated.

Figure 7:
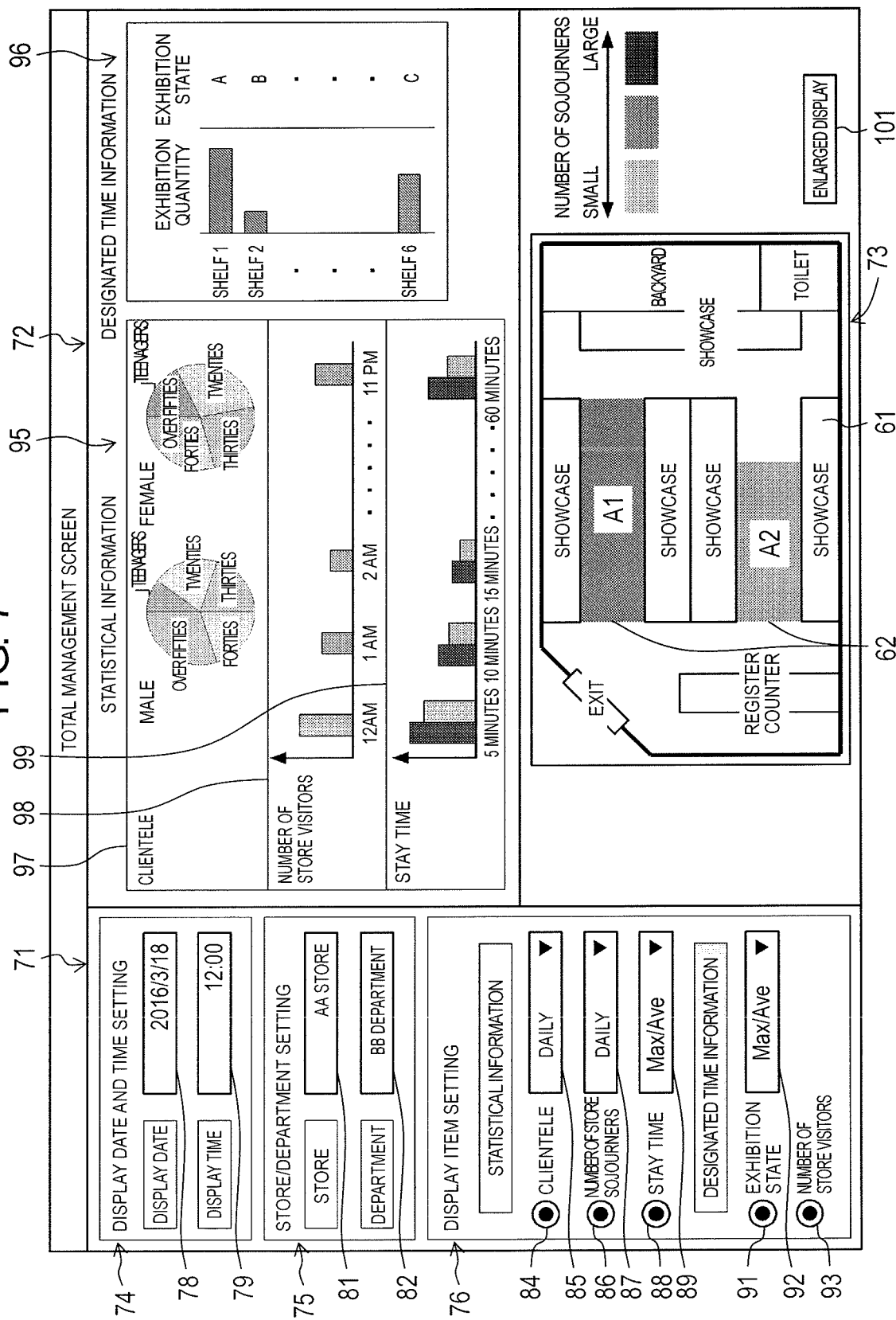
FIG. 7 is an explanatory diagram illustrating a total management screen which is generated in server device 2 and is displayed on user terminal device 3.

Subsequently, the total management screen, which is generated in server device 2 and is displayed on user terminal device 3, will be described. FIG. 7 is an explanatory diagram illustrating the total management screen which is generated in server device 2 and is displayed on user terminal device 3.

The total management screen displays various pieces of statistical information relevant to the whole store and the like, thereby enabling the user to check a state of the whole store. The total management screen is provided with display condition designator 71, store/department information display unit 72, and map display unit 73.

Display condition designator 71 is used to designate a date and time, a store, and a department which are targets of pieces of information to be displayed on store/department information display unit 72 and map display unit 73, and is used to designate items to be displayed on store/department information display unit 72. Display condition designator 71 is provided with display date and time designator 74, store/department designator 75, and display item designator 76.

In display date and time designator 74, the user designates date and time (display date and display time) to be displayed. In a case where display date button 78 is operated, a calendar screen (not illustrated in the drawing) is displayed. In a case where a date is selected on the calendar screen, the selected date is displayed. In addition, in a case where display time button 79 is operated, a time input screen (not illustrated in the drawing) is displayed. In a case where time is input on the time input screen, the input time is displayed.

In store/department designator 75, the user designates a store and a department to be displayed. In a case where store button 81 is operated, a store selection screen (not illustrated in the drawing), which is provided with a radio button for each store, is displayed. In a case where a store is selected on the selection screen, the selected store is displayed. In a case where department button 82 is operated, a department selection screen (not illustrated in the drawing), which is provided with a radio button for each department, is displayed. In a case where the department is selected on the selection screen, the selected department is displayed.

In display item designator 76, the user designates an item to be displayed on store/department information display unit 72. Here, in a display item relevant to the statistical information, respective radio buttons 84, 86, and 88 of the clientele, the number of store visitors, and the stay time are provided. Therefore, it is possible to select the clientele, the number of store visitors, and the stay time. In addition, in a display item relevant to designated time information, respective radio buttons 91 and 93 of the exhibition state and the number of store visitors are provided. Therefore, it is possible to select any one of the exhibition state and the number of store visitors.

In addition, display item designator 76 is provided with pull-down menus 85 and 87 used to select a day, a week, and time relevant to respective display items such as the clientele and the number of store visitors. In addition, pull-down menus 89 and 92 are provided to select a maximum value and an average value relevant to the respective display items such as the stay time and the exhibition state.

Store/department information display unit 72 displays statistical information relevant to the store and the department designated in display condition designator 71 and information of designated time using graphs. Store/department information display unit 72 is provided with statistical information display unit 95 and designated time information display unit 96.

Store/department information display unit 72 displays the information relevant to the display items designated in display item designator 76. In an example illustrated in FIG. 7, all the clientele, the number of store visitors, and the stay time are selected as the display items relevant to the statistical information. Therefore, clientele display unit 97, store visitor number display unit 98, and stay time display unit 99 are displayed on statistical information display unit 95. In addition, the exhibition state is selected as the display item relevant to the designated time information. Therefore, information relevant to the merchandise exhibition state is displayed on designated time information display unit 96.

Clientele display unit 97 displays a graph relevant to a clientele of customers who visit the store. In the example illustrated in FIG. 7, a proportion of the number of store visitors for each age group in each gender (male and female) is displayed using pie graphs.

Store visitor number display unit 98 displays a graph relevant to a temporal transition state of the number of store visitors (the number of customers who visit the store). In the example illustrated in FIG. 7, the number of store visitors in each time zone on a day is displayed using a bar graph.

Stay time display unit 99 displays a graph relevant to the stay time of the customer in the store. In the example illustrated in FIG. 7, a histogram representing frequency distribution of the stay time is displayed. In the histogram of the stay time, the stay time for each person on a day is classified into a plurality of threshold values (5 minutes, 10 minutes . . . ), the number of people is counted for each class, and the number of people (frequency) for each class is displayed. In addition, in the histogram of the stay time, the number of people on a display date, an average value or the maximum value of the number of people during a predetermined past period (for example, 10 years) are displayed. Meanwhile, the number of people on the display date and the number of people on a designated past date (for example, the same day as the display date) may be displayed.

Designated time information display unit 96 displays a graph relevant to the merchandise exhibition state in the designated time. Here, an exhibition quantity of each shelf of the showcase is displayed using a cross bar graph. In addition, the result of evaluation relevant to the quality of the exhibition state relevant to each shelf of the showcase is displayed using symbols (A, B, C).

Meanwhile, in a case where the number of store visitors is selected as the display item relevant to the designated time information, a graph relevant to the number of store visitors in the designated time is displayed on designated time information display unit 96.

Map display unit 73 displays an image in which digest image 62 of the target area is superimposed on store map image 61. Meanwhile, in the embodiment, the predetermined time (for example, 1 hour) is previously set as an initial value of the activity information observation period which is the underlying of the digest image, and digest image 62 based on the initial value of the observation period is displayed.

In addition, map display unit 73 is provided with enlarged display button 101. In a case where button 101 is operated, transition to the map display screen (refer to FIG. 8) is performed.

Meanwhile, in the example illustrated in FIG. 7, display condition designator 71, store/department information display unit 72, and map display unit 73 are provided in one screen. However, display condition designator 71, store/department information display unit 72, and map display unit 73 may be displayed as separated screens, that is, a display condition designation screen, a store/department information display screen, and a map display screen may be separately displayed.

Figure 8:
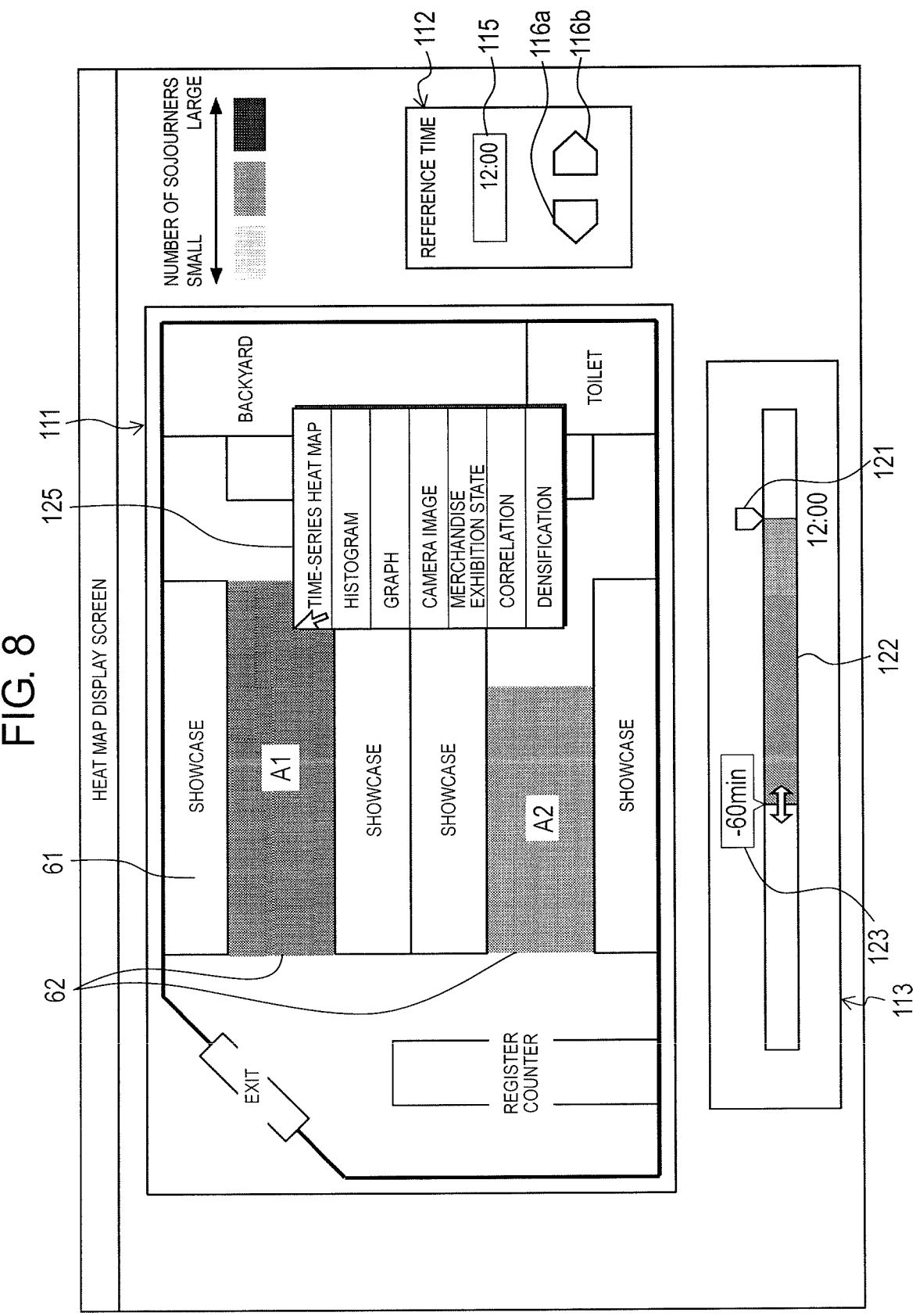
FIG. 8 is an explanatory diagram illustrating a map display screen which is generated in server device 2 and is displayed on user terminal device 3.

Subsequently, the map display screen, which is generated in server device 2 and is displayed on user terminal device 3, will be described. FIG. 8 is an explanatory diagram illustrating the map display screen which is generated in server device 2 and is displayed on user terminal device 3.

In a case where enlarged display button 101 is operated in total management screen (refer to FIG. 7), transition is performed to the map display screen (activity state display screen) illustrated in FIG. 8.

The map display screen is provided with map display unit 111, reference time designator 112, and observation period designator (operation unit) 113.

In map display unit 111, digest image (activity state display image) 62 of the target area is displayed by being superimposed on store map image 61. Digest image 62 is displayed in a single display color according to indexed information acquired by indexing (integrating) the activity information for each cell which is set on the captured image.

Here, digest images 62 of a plurality of target areas which have different activity states are displayed by colors. For example, digest image 62 of a target area, in which the number of staying people is large or the stay time is long, is displayed by a red color, and digest image 62 of a target area, in which the number of staying people is small or the stay time is short, is displayed by a green color. Therefore, it is possible for the user to immediately grasp a popular department.

Reference time designator 112 is used for the user to designate reference time of digest image 62. Reference time designator 112 is provided with reference time display unit 115 and left and right-arrow buttons 116a and 116b. In the embodiment, end time of the activity information observation period which is the underlying of digest image 62 is set as the reference time.

Arrow buttons 116a and 116b are used to perform time sending at a predetermined interval. In a case where left arrow button 116a is operated, display time is changed into time (for example, before 15 minutes) of immediately before timing. In a case where right arrow button 116b is operated, display time is changed into time (for example, after 15 minutes) of immediately after timing. Meanwhile, the time sending interval may correspond to camera image acquisition timing (for example, 15-minute interval).

Meanwhile, in reference time designator 112, reference time may be designated through selection of radio button for each time zone and movement of slider in a slide bar.

Observation period designator 113 is used for the user to designate the activity information observation period. In the embodiment, an initial value of the observation period (for example, 1 hour) is set. However, it is possible for the user to set the observation period to arbitrary time by observation period designator 113. Observation period designator 113 is provided with mark 121 representing the reference time, bar 122 representing the observation period, and observation period display unit 123. In bar 122, a left end location and a right end location indicate start time and end time of the observation period, respectively.

In the embodiment, reference time, which is the end time of the observation period, is designated. The user designates a period, which is gone back from the reference time, as the observation period. That is, mark 121 representing the reference time is displayed and the right end of bar 122 is located in time which is designated in reference time designator 112. In contrast, it is possible to move the left end location of bar 122 representing the start time of the observation period through a drag operation. It is possible to designate the start time of the observation period, that is, a length of the observation period through the drag operation. Therefore, the observation period, which is displayed on observation period display unit 123, changes according to the drag operation.

Meanwhile, in the embodiment, the period on a side of the past from the reference time is designated as the observation period. However, a period on a side of the future from the reference time may be designated as the observation period.

In addition, in a case where an operation of selecting (clicking) the target area is performed on the map display screen, display item selection menu (selector) 125 is displayed. Display item selection menu 125 includes the time-series heat map, the histogram, the graph, the camera image, the merchandise exhibition state, and respective correlated display items. In a case where one of them is selected, transition is performed to the relevant information display screen (refer to FIG. 9 to FIG. 14). In addition, display item selection menu 125 includes a densified display item. In a case where the densified display item is selected, transition is performed to the map display screen (refer to FIG. 15) which displays heat map image 161 acquired by densifying digest image 62.

Subsequently, the relevant information display screen, which is generated in server device 2 and is displayed on user terminal device 3, will be described. The relevant information display screen, which is illustrated in FIG. 9 to FIG. 14, provides information, such as a customer activity state and a merchandise exhibition state relevant to the target area that attracts user's attention, to the user, the information being relevant to designated digest image 62 of the target area.

Figure 9:
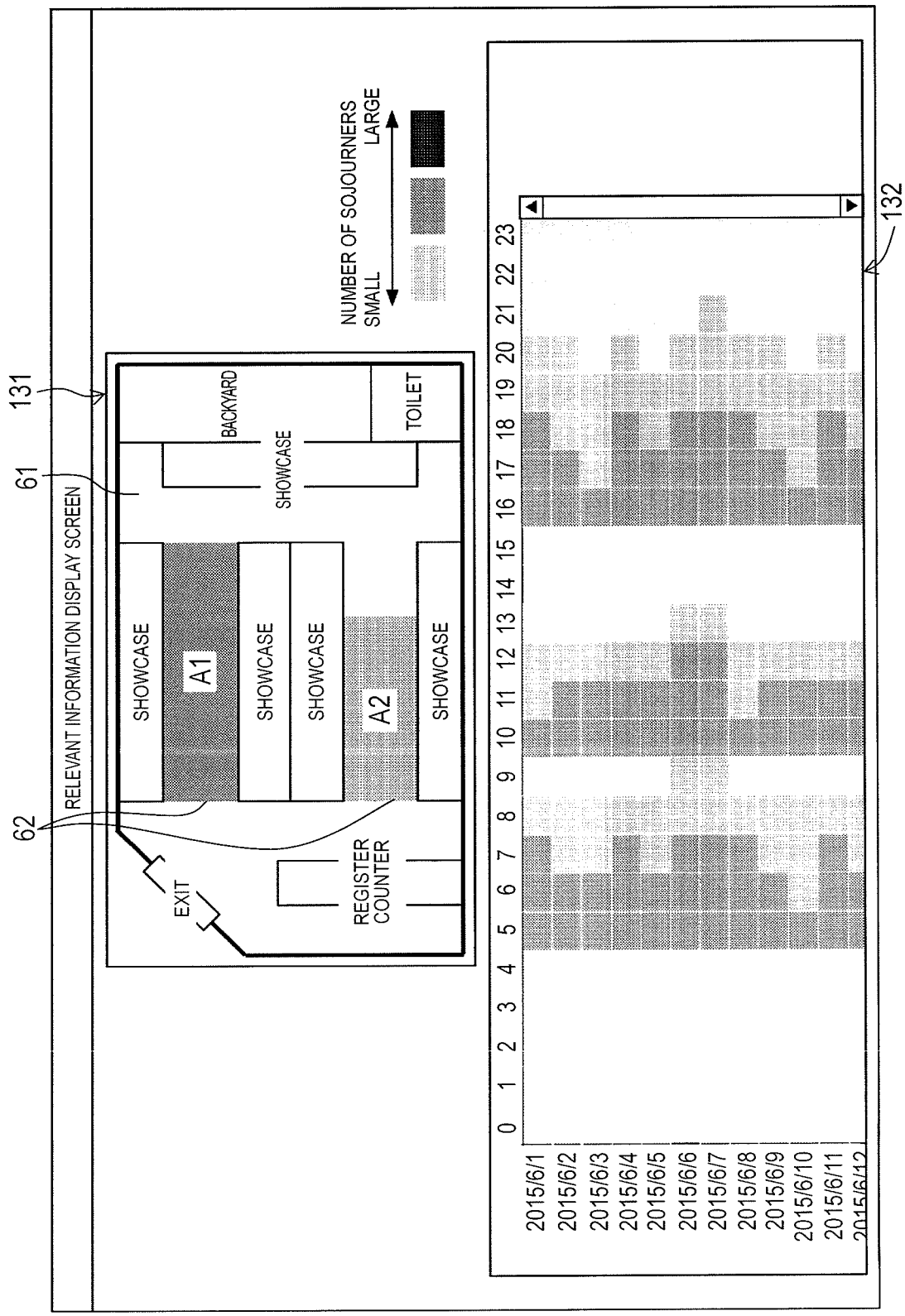
FIG. 9 is an explanatory diagram illustrating a relevant information display screen which is displayed in a case where a display item of a time-series heat map is selected.

First, the relevant information display screen, which is displayed in a case where a display item of the time-series heat map is selected, will be described. FIG. 9 is an explanatory diagram illustrating the relevant information display screen which is displayed in the case where the display item of the time-series heat map is selected.

In the case where the target area is selected in the map display screen (refer to FIG. 8) and the display item of the time-series heat map is selected, transition is performed to the relevant information display screen illustrated in FIG. 9.

Relevant information display screen is provided with map display unit 131 and relevant information display unit 132.

Although map display unit 131 is similar to map display unit 111 in the map display screen (refer to FIG. 8), relevant information display unit 132 is disposed in empty space by reducing and displaying images.

Relevant information display unit 132 is displayed with the time-series heat map representing a temporal transition state of the statistical information relevant to a customer stay state in a designated target area. The time-series heat map is displayed in such a way that, as the statistical information, the activity information (the number of staying people and the stay time) for each time zone (1 hour) on each day which is divided into lattice shapes is displayed. Here, the activity information is expressed using the change in the display color, similar to the digest image displayed on map display unit 131.

Therefore, in a case where a specific day attracts attention and pieces of activity information of the respective time zones of the day are compared, it is possible for the user to grasp a temporal transition state of the number of staying people on the day. In addition, in a case where a specific time zone attracts attention and sojourn degrees for each day in the time zone are compared, it is possible for the user to grasp, for example, a change in the activity information according to a day.

Figure 10:
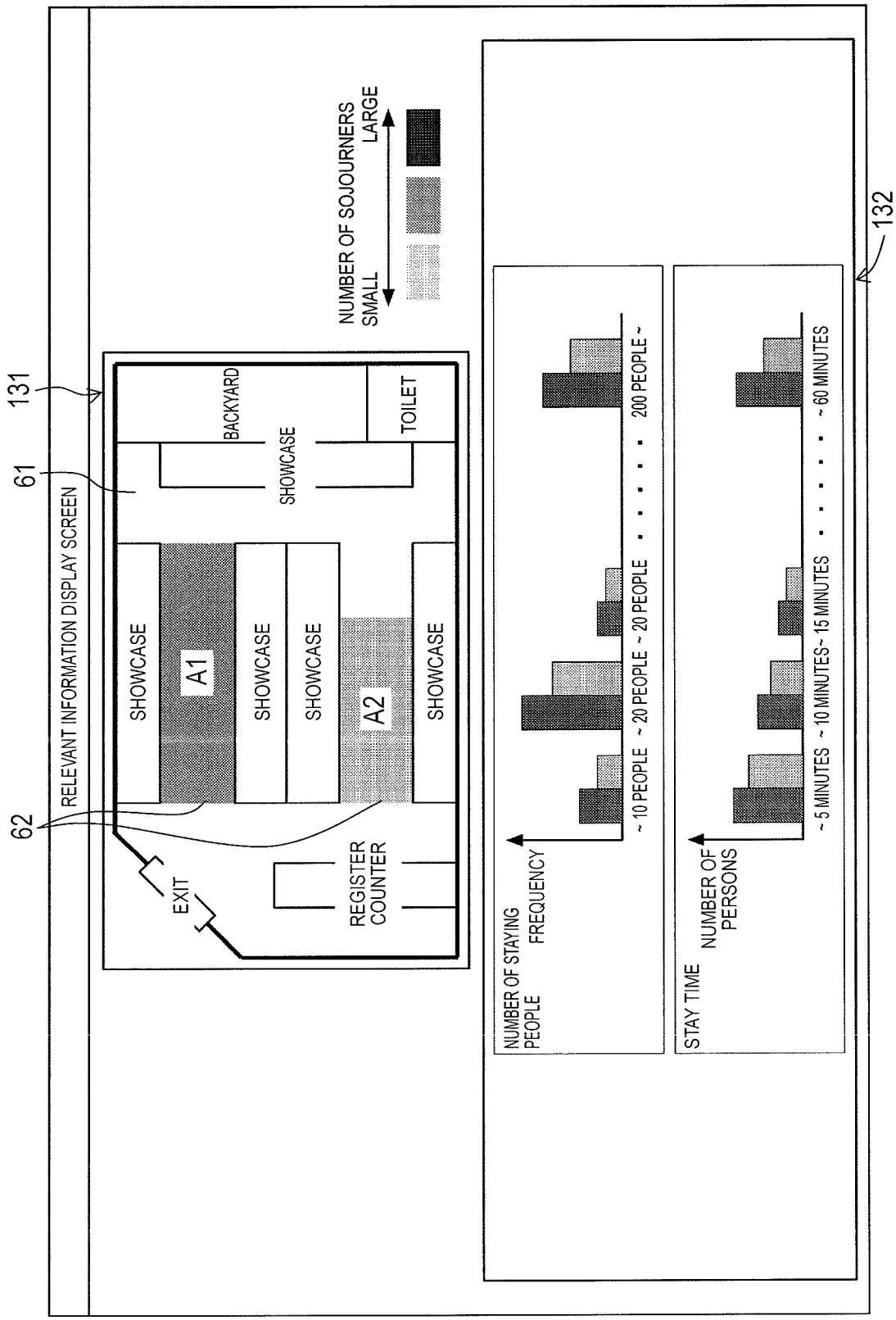
FIG. 10 is an explanatory diagram illustrating a relevant information display screen which is displayed in a case where a display item of a histogram is selected.

Subsequently, the relevant information display screen, which is displayed in a case where a display item of the histogram is selected, will be described. FIG. 10 is an explanatory diagram illustrating the relevant information display screen displayed in the case where the display item of the histogram is selected.

In a case where the target area is selected and the display item of the histogram is selected in the map display screen (refer to FIG. 8), transition is performed to the relevant information display screen illustrated in FIG. 10.

On the relevant information display screen, the histogram representing the frequency distribution of the statistical information relevant to the stay state of the customer in the designated target area is displayed on relevant information display unit 132. In an example illustrated in FIG. 10, a histogram of the number of staying people and the stay time is displayed.

In the histogram of the number of staying people, the number of staying people for each unit time on a day is classified into a plurality of threshold values (10 people, 20 people . . . ), and the number of times (frequency) that the number of staying people appears for each class is displayed. In the histogram of the stay time, the stay time for each person on a day is classified into a plurality of threshold values (5 minutes, 10 minutes . . . ), the number of people is counted for each class, and the number of people (frequency) for each class is displayed.

In addition, in the histogram of the number of staying people and the stay time, the frequency (the number of times and the number of people) of the display date and an average value or a maximum value of the frequency during the predetermined past period are displayed. Meanwhile, the frequency of the display date and the frequency of the designated past date (for example, the same date as the display date) may be displayed.

Figure 11:
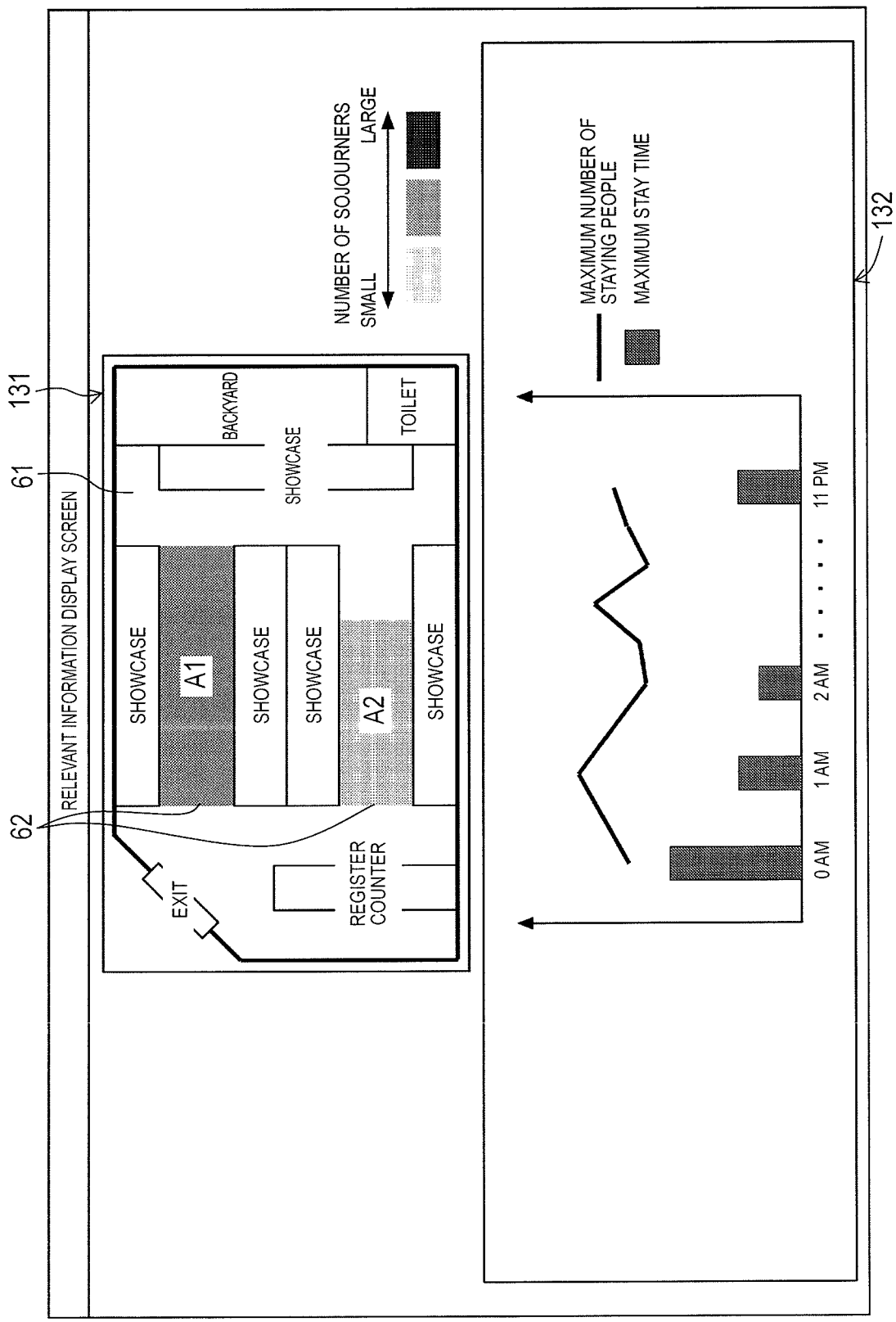
FIG. 11 is an explanatory diagram illustrating the relevant information display screen which is displayed in a case where a display item of a graph is selected.

Subsequently, the relevant information display screen, which is displayed in a case where a display item of the graph is selected, will be described. FIG. 11 is an explanatory diagram illustrating the relevant information display screen which is displayed in the case where the display item of the graph is selected.

In a case where the target area is selected on the map display screen (refer to FIG. 8) and the display item of the graph is selected, transition is performed to the relevant information display screen illustrated in FIG. 11.

The relevant information display screen is displayed with a graph representing the temporal transition state of the statistical information relevant to the customer stay state in the designated target area in relevant information display unit 132. In an example illustrated in FIG. 11, a graph of the maximum number of staying people and the maximum stay time is displayed as the statistical information.

The maximum number of staying people is a maximum value of the number of customers who stay in the target area for each time zone during the predetermined unit period. The maximum stay time is a maximum value of the stay time of the customer who stays in the target area for each time zone during the predetermined unit period. Here, the maximum number of staying people for each time zone of one day is displayed using a zigzag graph, and the maximum stay time for each time zone of one day is displayed using a bar graph.

Meanwhile, in the example illustrated in FIG. 11, the graph of the maximum number of staying people and the maximum stay time is displayed. However, besides this, a graph of the average number of staying people, that is, a graph of an average value of the number of customers who stay in the target area for each time zone during the predetermined unit period and a graph of average stay time, that is, a graph of an average value of the stay time of the customer who stays in the target area for each time zone during the predetermined unit period may be displayed.

Figure 12:
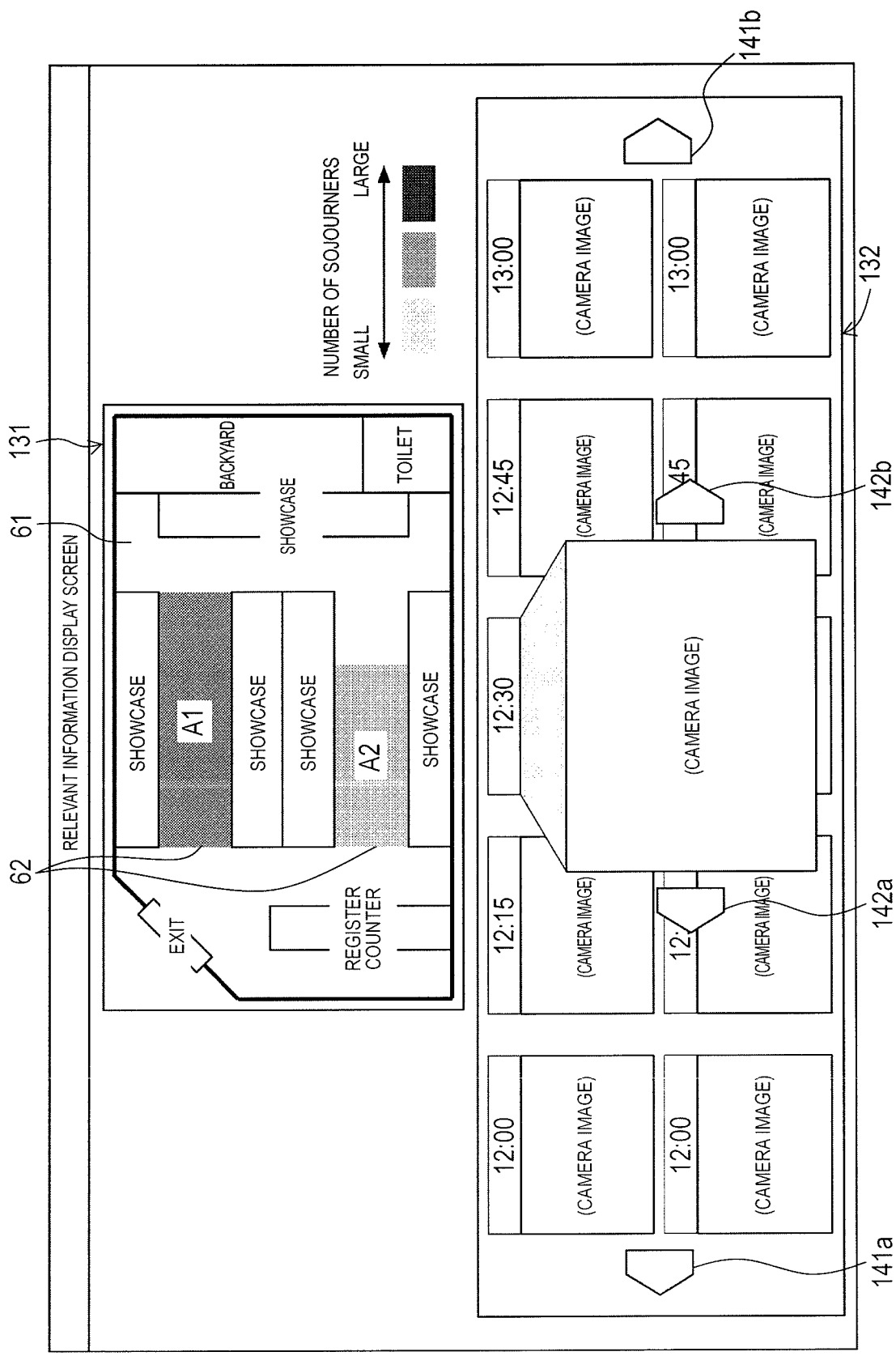
FIG. 12 is an explanatory diagram illustrating the relevant information display screen which is displayed in a case where a display item of a camera image is selected.

Subsequently, the relevant information display screen, which is displayed in a case where a display item of the camera image is selected, will be described. FIG. 12 is an explanatory diagram illustrating the relevant information display screen which is displayed in the case where the display item of the camera image is selected.

In a case where the target area is selected in the map display screen (refer to FIG. 8) and the display item of the camera image is selected, transition is performed to the relevant information display screen illustrated in FIG. 12.

On the relevant information display screen, the camera images of cameras 1, which are relevant to the selected target area, that is, camera 1, which images the target area, and camera 1, which images the exhibition area (showcase or the like) in the vicinity of the target area, of each time are displayed as a list on relevant information display unit 132. Here, camera images, which are acquired by imaging the same area, are displayed in the horizontal direction in order of imaging time, and camera images, which are acquired by imaging another area, are displayed in a vertical direction.

Therefore, compared to digest image 62, it is possible to grasp an actual department state in each time in each department by observing the camera images in each time.

In addition, left and right arrow buttons 141a and 141b are provided on both sides of the camera images. Arrow buttons 141a and 141b are used to display a camera image corresponding to time which is not included in relevant information display unit 132. In a case where left and right arrow buttons 141a and 141b are operated, respectively, one camera image displayed on relevant information display unit 132 is moved in a right direction or in a left direction such that a camera image corresponding to time, which is not displayed, is displayed.

In addition, in a case where an operation for selecting the camera image is performed, an enlarged image of the selected camera image is displayed. Therefore, it is possible to grasp the actual state of the department in time, which attracts attention, in detail. In addition, on both sides of the enlarged image, left and right arrow buttons 142a and 142b are provided. In a case where arrow buttons 142a and 142b are operated, it is possible to display enlarged images in immediately before and after time.

Meanwhile, although all the camera images, which are acquired from camera 1, at the predetermined interval (for example, 15-minute interval) may be displayed, a camera image for each activity information observation period (for example, 1 hour) may be displayed.

In addition, the camera image includes an image acquired by mostly imaging a merchandise exhibition area, such as the showcase, and an image acquired by mostly imaging a passageway. However, in the image acquired by mostly imaging the exhibition area, the moving object-removed image may be displayed such that it is possible to observe a state of the merchandise. In contrast, in the image acquired by mostly imaging the passageway, the privacy-protected image may be displayed such that it is possible to observe a state of the customer who exists in the passageway.

In addition, although the enlarged image is separately displayed, the camera image may be enlarged and displayed by performing an operation for enlarging the screen, for example, a pinch-out operation in a touch panel display such as a smart phone or a tablet terminal using a high-resolution image for the camera image.

Figure 13:
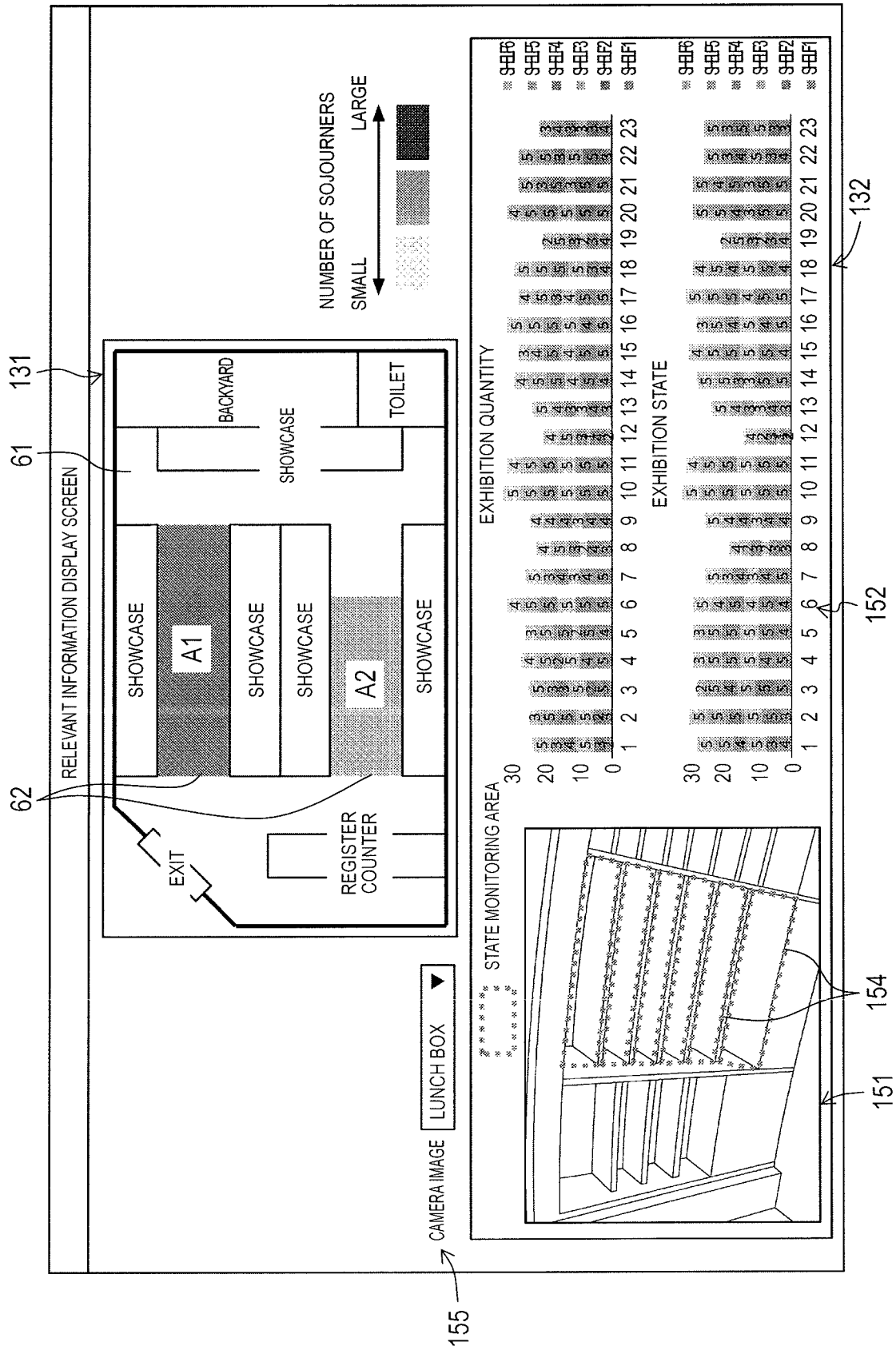
FIG. 13 is an explanatory diagram illustrating the relevant information display screen which is displayed in a case where a display item of a merchandise exhibition state is selected.

Subsequently, the relevant information display screen, which is displayed in a case where a display item of the merchandise exhibition state is selected, will be described. FIG. 13 is an explanatory diagram illustrating the relevant information display screen which is displayed in the case where the display item of the merchandise exhibition state is selected.

In a case where the target area is selected and the display item of the merchandise exhibition state is selected in the map display screen (refer to FIG. 8), transition is performed to the relevant information display screen illustrated in FIG. 13.

On the relevant information display screen, camera image display unit 151 and graph display unit 152 are provided on relevant information display unit 132.

Camera image display unit 151 is displayed with a camera image acquired by imaging the exhibition area (showcase or the like) which is adjacent to the designated target area. In a case where the camera image is observed, it is possible to grasp an actual merchandise exhibition state in the department. In addition, the camera image is displayed with frame image 154 representing the state monitoring area which is set by the user. In an example illustrated in FIG. 13, the state monitoring area is set so as to surround an area, in which the merchandise exists, on each shelf board of the showcase.

In addition, it is possible to perform selection using camera image selector 155 which is displayed on camera image display unit 151. In camera image selector 155, candidates of the camera images, which are acquired by imaging the exhibition area that is adjacent to the designated target area, are displayed using a pull-down menu.

Graph display unit 152 is displayed with a graph representing the temporal transition state of the statistical information (the exhibition quantity and the exhibition state) relevant to the merchandise exhibition state. The graph is acquired by targeting each state monitoring area displayed on camera image display unit 151, the statistical information for each time zone in each state monitoring area is evaluated in five stages, and an evaluation value (1 to 5) of each state monitoring area for each time zone is illustrated in a cumulative bar graph.

In addition, in a case where an operation for selecting the graph and characteristics for each time zone displayed on graph display unit 152 is performed, the camera image of the selected time zone is displayed on camera image display unit 151.

In a graph relevant to the exhibition quantity, the merchandise exhibition quantity in each state monitoring area for each time zone, specifically, a ratio of the exhibition quantity in designated time to the maximum exhibition quantity in a state in which the merchandise is maximally exhibited is evaluated in five stages. In a graph relevant to the exhibition state, the quality of the merchandise exhibition state in each state monitoring area for each time zone is evaluated in five stages.

As described above, in the embodiment, the camera image, which is acquired by imaging the exhibition area which is adjacent to the designated target area, and a graph representing the temporal transition state of the statistical information relevant to the merchandise exhibition state in the state monitoring area reflected in the camera image are simultaneously displayed. Therefore, in a case where the camera image is compared with the graph, it is possible to grasp a temporal transition state of the merchandise exhibition state in detail.

Meanwhile, the statistical information (the exhibition quantity and the exhibition state) may be expressed by changing a display color of frame image 154 representing the state monitoring area.

Figure 14:
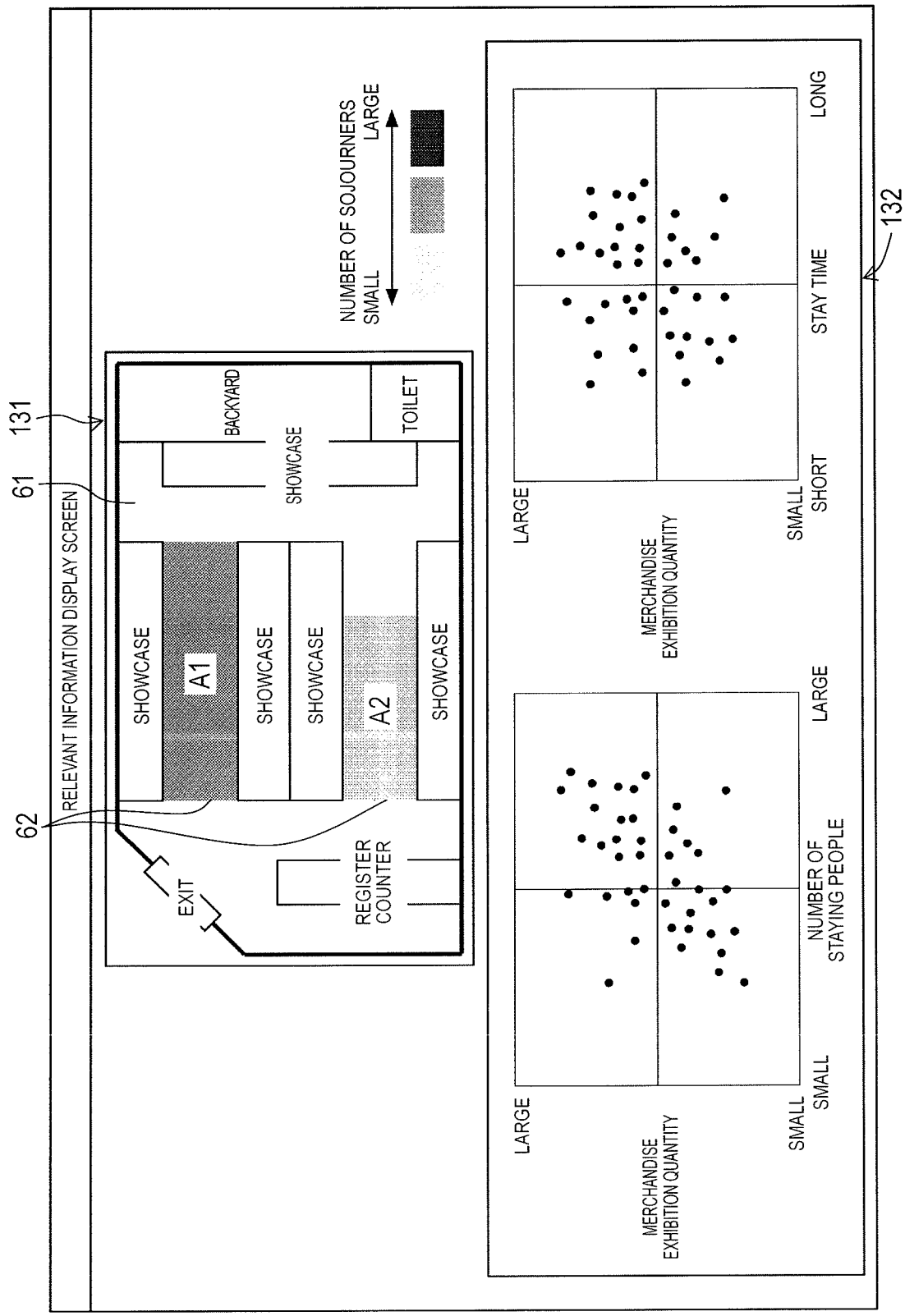
FIG. 14 is an explanatory diagram illustrating the relevant information display screen which is displayed in a case where a display item of a correlation is selected.

Subsequently, a relevant information display screen, which is displayed in a case where the correlated display item is selected, will be described. FIG. 14 is an explanatory diagram illustrating the relevant information display screen which is displayed in a case where the correlated display item is selected.

In a case where the target area is selected and the correlated display item is selected on the map display screen (refer to FIG. 8), transition is performed to the relevant information display screen illustrated in FIG. 14.

On the relevant information display screen, scatter diagrams representing mutual correlations between pieces of the statistical information are displayed on relevant information display unit 132.

In an example illustrated in FIG. 14, a scatter diagram representing the correlation between the number of staying people and the exhibition quantity and a scatter diagram representing the correlation between the stay time and the exhibition quantity are displayed. The scatter diagrams are acquired by plotting the number of staying people, the stay time, and the exhibition quantity, which are collected for each time zone for the designated target area. It is possible to check existence/non-existence of the mutual correlation between pieces of the statistical information using the scatter diagrams.

That is, in the example illustrated in FIG. 14, the correlation between the number of staying people and the exhibition quantity is recognized in the scatter diagram representing the correlation between the number of staying people and the exhibition quantity, and the correlation between the stay time and the exhibition quantity is not recognized in the scatter diagram representing the correlation between the stay time and the exhibition quantity.

Meanwhile, it may be possible for the user to select the statistical information which causes the correlation to be displayed using the scatter diagrams in the relevant information display screen.

Figure 15:
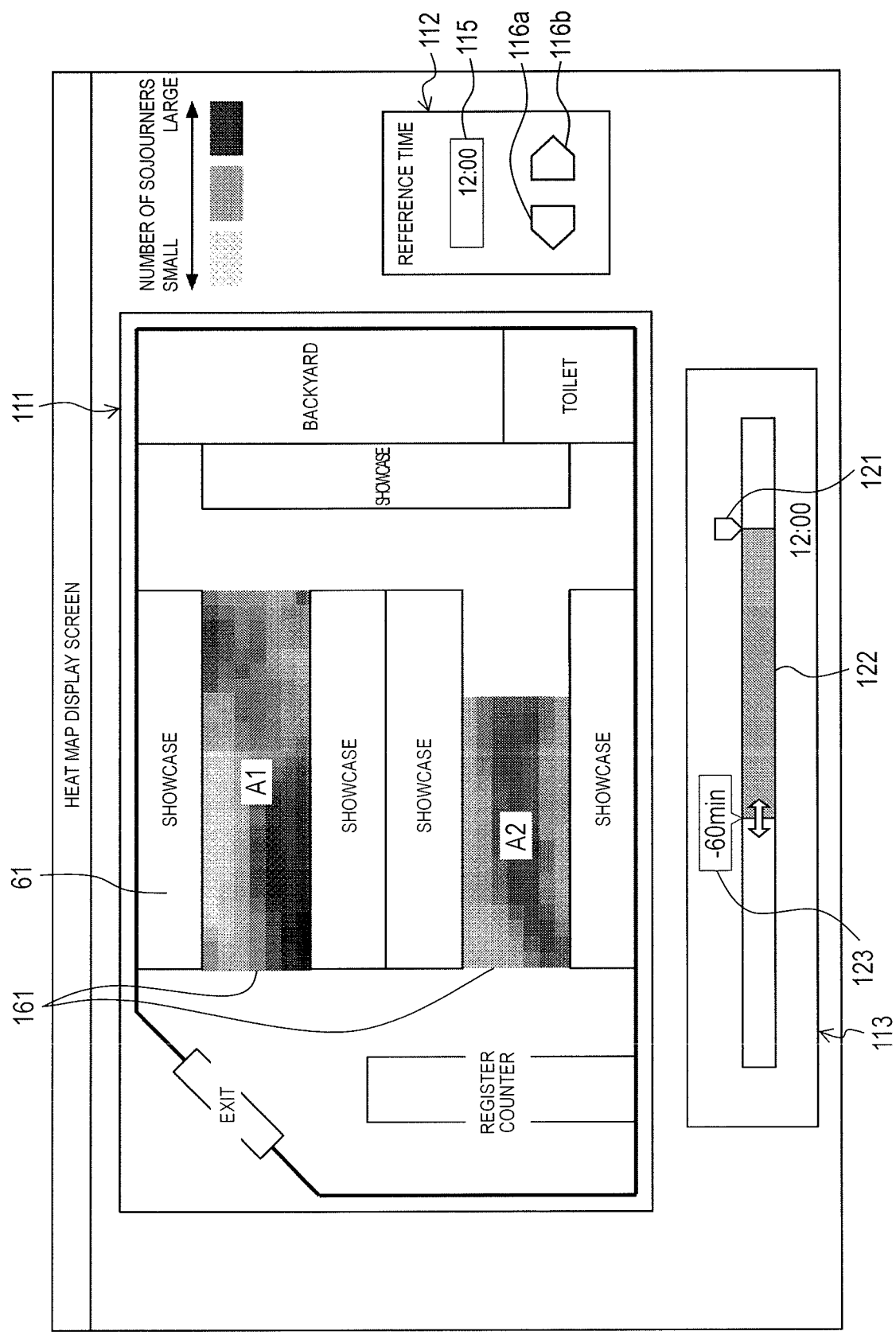
FIG. 15 is an explanatory diagram illustrating the map display screen displayed in a case where a display item of densification is selected.

Subsequently, the map display screen, which is displayed in a case where a display item of densification is selected, will be described. FIG. 15 is an explanatory diagram illustrating the map display screen which is displayed in the case where the display item of densification is selected.

In a case where the target area is selected and the display item of the densification is selected in the map display screen (refer to FIG. 8), transition is performed to the map display screen illustrated in FIG. 15.

On the map display screen, heat map image 161, which is acquired by densifying digest image 62, is displayed. On the map display screen illustrated in FIG. 8, digest image 62 is displayed with a single color on the basis of the indexed information integrated in the whole target area. However, on the map display screen illustrated in FIG. 15, an inside of heat map image 161 is divided using a plurality of colors and is displayed according to the activity information (the number of staying people and the stay time) in each location in the target area.

In this case, without performing a processing for integrating the activity information in indexed information generator 54, heat map image 161 may be generated on the basis of the activity information for each cell located on the inside of the target area in activity state display image generator 55. In addition, heat map image 161 may be generated on the basis of the activity information for each sub cell which is acquired by densifying each cell that is set on the captured image.

It is possible for the user to grasp a customer sojourn state in the target area using the densified heat map image 161. For example, in the embodiment, the target area is set in the passageway between showcases. Therefore, in a case where the number of sojourners is large at a central part of the target area, it is possible for the user to grasp that a large number of customers pass through the passageway. In addition, in a case where a visit degree is high at an end part of the target area which faces the showcase, it is possible for the user to grasp that the customer shows high interest in the merchandise of the showcase, for example, the user evaluates the merchandise of the showcase.

Second Embodiment

Subsequently, a second embodiment will be described. Meanwhile, cases which are not particularly mentioned here are the same as in the first embodiment.

In the first embodiment, the moving line of the person is acquired and the activity information (the sojourn time and a sojourn frequency) is acquired on the basis of the moving line. However, in the second embodiment, the number of times that each pixel (detection element) of the captured image is located in a person area (area where the person exists) is counted, a moving object activity value (count value) is acquired for each pixel, the moving object activity value is integrated in the target area as the moving object activity value representing the activity level of the person for each pixel through an appropriate statistical processing, for example, averaging, thereby acquiring the activity information of the target area.

First, person detector 42 of camera 1 acquires coordinate information relevant to the person area as the positional information of the person.

Furthermore, activity information generator 44 counts the number of times that each pixel of the captured image is located in the person area on the basis of the coordinate information relevant to the person area acquired in person detector 42, and acquires the moving object activity value (count value) for each pixel as the activity information.

Specifically, whenever each pixel enters the person area, a count value of the pixel increases by 1. Each pixel is continuatively counted in the person area during a predetermined detection unit period, and thus the moving object activity value of the pixel unit for each detection unit period is sequentially acquired. Meanwhile, in a case where continuative entrance to the person area occurs a predetermined number of times (for example, three times), the moving object activity value (count value) may increase by 1 by taking erroneous detection of the person area into consideration.

In this manner, in a case where the moving object activity value for each detection unit period is sequentially acquired, the statistical processing (for example, simple adding and averaging) for integrating the moving object activity value for each detection unit period during the observation period is performed, and the moving object activity value during the observation period is acquired.

Meanwhile, the person area may be a person frame (a rectangular area where the person exists), an upper body area of a detected person, and an existence area of the detected person on a floor.

In server device 2, indexed information generator 54 integrates the activity information, which is acquired in activity information acquirer 52, that is, the moving object activity value for each pixel in the target area, and acquires the moving object activity value of the whole target area as the indexed information. Particularly, in the embodiment, the moving object activity value for each of the plurality of pixels located in the target area is averaged, and the moving object activity value of the whole target area is acquired. Furthermore, activity state display image generator 55 generates the digest image (activity state display image) on the basis of the moving object activity value of the whole target area.

In addition, in a case where the heat map image 161, in which digest image 62 is densified, is displayed as illustrated in FIG. 15, indexed information generator 54 does not perform the processing for integrating the moving object activity value. The activity state display image generator 55 may generate heat map image 161 on the basis of the moving object activity value for each pixel located in the target area.

Meanwhile, the target area may be divided into a plurality of cells such that indexed information generator 54 integrates moving object activity value for each pixel in units of a cell and acquires the moving object activity value (indexed information) in units of a cell, and activity state display image generator 55 generates the digest image on which color division is performed in units of a cell on the basis of the moving object activity value in units of a cell.

As described above, the embodiments are described as examples of a technology disclosed in the present application. However, the technology disclosed in the present application is not limited thereto, and may be applied to embodiments on which change, replacement, addition, omission, and the like are performed. In addition, it is possible to combine respective components described in the above embodiments and to make a new embodiment.

For example, in the embodiment, the example of the retail store, such as the convenience store, is described. However, the present disclosure is not limited to the retail store, and it is possible to apply the present disclosure to a store which has a business form other than the retail store.

In addition, in the embodiment, as illustrated in FIG. 2, the omnidirectional camera, which has a 360-degree photographing range, using the fisheye lens is used as camera 1. However, it is possible to use a camera, which has a predetermined angle of view so-called a box camera.

In addition, in the embodiment, camera 1 performs the respective processes for generating the moving object-removed image, performing the person detection, generating the privacy-protected image, generating the activity information, and determining the attribute. However, the entirety or a part of the processes may be performed by server device 2 or a PC which is installed in the store. Server device 2 performs the respective processes for setting target area, generating the indexed information, generating the digest image, determining the exhibition state, generating the statistical information, and generating the output information. However, the entirety or a part of the processes may be performed by camera 1 or a PC which is installed in the store.

INDUSTRIAL APPLICABILITY

The intra-facility activity analysis device, the intra-facility activity analysis system, and the intra-facility activity analysis method according to the present disclosure have an advantage in that it is possible for the user to immediately grasp the activity state of the person in an area, which attracts the user's attention, on the inside of the facility, and perform analysis relevant to the activity state of the moving object on the basis of the activity information generated from the captured image acquired by imaging the inside of the facility, thereby being useful as the intra-facility activity analysis device, the intra-facility activity analysis system, and the intra-facility activity analysis method which generate output information in which the activity state of the moving object is visualized.

REFERENCE MARKS IN THE DRAWINGS

1 CAMERA
2 SERVER DEVICE
3 USER TERMINAL DEVICE
44 ACTIVITY INFORMATION GENERATOR
51 CAMERA IMAGE ACQUIRER
52 ACTIVITY INFORMATION ACQUIRER
53 TARGET AREA SETTER
54 INDEXED INFORMATION GENERATOR
55 ACTIVITY STATE DISPLAY IMAGE GENERATOR
56 EXHIBITION STATE DETERMINATOR
57 STATISTICAL INFORMATION GENERATOR
58 OUTPUT INFORMATION GENERATOR
61 STORE MAP IMAGE (FACILITY MAP IMAGE)
62 DIGEST IMAGE (ACTIVITY STATE DISPLAY IMAGE)
111 MAP DISPLAY UNIT
112 REFERENCE TIME DESIGNATOR
113 OBSERVATION PERIOD DESIGNATOR (OPERATION UNIT)
125 DISPLAY ITEM SELECTION MENU (SELECTOR)
161 HEAT MAP IMAGE (DENSIFIED ACTIVITY STATE DISPLAY IMAGE)

The invention claimed is:

1. An intra-facility activity analysis device, which performs analysis relevant to an activity state of a moving object on the basis of activity information generated from a captured image acquired by imaging an inside of a facility, and generates output information acquired by visualizing the activity state of the moving object, the intra-facility activity analysis device comprising:
a processor; and
a memory that stores an instruction,
wherein the processor, when executing the instruction stored in the memory, performs operations including:
acquiring the activity information representing an activity level of the moving object for each of a plurality of predetermined detection elements acquired through division performed on the captured image;
setting a target area on a facility map image acquired by drawing a layout on the inside of the facility;
generating indexed information of the target area, acquired by integrating the activity state of the moving object in the target area on the basis of the activity information for the plurality of predetermined detecting elements in the target area;
generating an activity state display image representing overall activity state of the moving object in the target area on the basis of the indexed information;
generating the output information which includes first display information acquired by superimposing the activity state display image on the facility map image;
displaying the generated first display information, on a display;
receiving an operation for designating densification of the activity state display image by a user, while the first display information is displayed on the display;
in response to receiving the operation for designating densification while the first display information is displayed on the display, generating a densified activity state display image representing the activity state of the moving object in each of the plurality of predetermined detecting elements on the inside of the target area on the basis of the activity information for each of the plurality of predetermined detecting elements in the target area;
generating the output information including second display information acquired by superimposing the densified activity state display image on the facility map image; and
switching an image displayed on the display from the first display information to the generated second display information.

2. The intra-facility activity analysis device of claim 1, wherein the target area is set in an arbitrary shape designated by the user according to an input operation of the user.

3. The intra-facility activity analysis device of claim 1, wherein the activity information is related to at least any one of the number of staying people, which is the number of people who stay in the target area, and stay time which is time during which a person stays in the target area.

4. The intra-facility activity analysis device of claim 1, wherein the output information relevant to an activity state display screen is generated that includes a map display unit, which displays the activity state display image superimposed on the facility map image and an operation unit, which causes the user to designate an observation period of the activity information, and
wherein the activity information which is generated during the observation period designated by the user is acquired.

5. The intra-facility activity analysis device of claim 1, wherein the processor, when executing the instruction stored in the memory, further performs operations including:
generating statistical information relevant to a state on the inside of the facility,
wherein the output information is generated that includes the first display information, which is acquired by superimposing the activity state display image on the facility map image, and relevant display information which causes the statistical information relevant to the activity state display image to be displayed as relevant information.

6. The intra-facility activity analysis device of claim 5, wherein the output information relevant to an activity state display screen is generated that includes a map display unit, which displays the activity state display image superimposed on the facility map image, and a selector, which causes a display item of the relevant information to be selected, and
in response to receiving an operation for selecting the display item in the selector by the user, the output information relevant to a relevant information display screen that displays the relevant information of the selected display item is generated.

7. The intra-facility activity analysis device of claim 1, wherein the processor, when executing the instruction stored in the memory, further performs operations including:
acquiring a camera image acquired by imaging the inside of the facility,
wherein display information is generated in which a plurality of the camera images relevant to the target area are disposed in time series.

8. The intra-facility activity analysis device of claim 7, wherein the output information relevant to a relevant information display screen, which displays the plurality of camera images disposed in time series to be selectable, is generated, and
in response to receiving an operation for selecting a camera image on the relevant information display screen by the user, the selected camera image on the relevant information display screen is enlarged and displayed.

9. The intra-facility activity analysis device of claim 1, wherein the processor, executing the instruction stored in the memory, further performs operations including:
determining a merchandise exhibition state in an exhibition area relevant to the target area in a store as the facility on the basis of a camera image,
wherein display information which displays a graph representing the merchandise exhibition state in the exhibition area is generated on the basis of a result of the determining of the merchandize exhibition state.

10. The intra-facility activity analysis device of claim 9, wherein the display information displays the graph representing the merchandise exhibition state in the exhibition area and the camera image relevant to the target area in parallel.

11. The intra-facility activity analysis device of claim 1, wherein
in the activity state display image, the target area is entirely filled with a single color, a single pattern or a single contrasting density corresponding to the indexed information of the target area, and
in the densified activity state display image, the target area is filled with a plurality of colors, a plurality of patterns, or a plurality of contrasting densities, so that each of the plurality of predetermined detecting elements in the target area is filled with a color, a pattern or a contrasting density corresponding to the activity state of the moving object in the predetermined determined element.

12. An intra-facility activity analysis system, which performs analysis relevant to an activity state of a moving object on the basis of activity information generated from a captured image acquired by imaging an inside of a facility, and generates output information acquired by visualizing the activity state of the moving object, the intra-facility activity analysis system comprising:
a camera that images the inside of the facility, generates the activity information representing an activity level of the moving object for each of a plurality of predetermined detection elements acquired through division performed on the captured image, and outputs the activity information;
a server device that generates the output information acquired by visualizing the activity information; and
a user terminal device that displays a reading screen acquired by visualizing the activity information on the basis of the output information,
wherein the server device includes:
a memory that stores instructions; and
a processor, when executing the instructions stored in the memory, that performs operations including:
acquiring the activity information from the camera,
setting a target area on a facility map image acquired by drawing a layout on the inside of the facility,
generating indexed information of the target area, acquired by integrating the activity state of the moving object in the target area on the basis of the activity information for the plurality of predetermined detecting elements in the target area,
generating an activity state display image representing overall activity state of the moving object in the target area on the basis of the indexed information,
generating the output information which includes first display information acquired by superimposing the activity state display image on the facility map image,
displaying the generated first display information, on the user terminal device,
receiving an operation for designating densification of the activity state display image by a user, while the first display information is displayed on the user terminal device,
in response to receiving the operation for designating densification while the first display information is displayed on the user terminal device, generating a densified activity state display image representing the activity state of the moving object in each of the plurality of predetermined detecting elements on the inside of the target area on the basis of the activity information for each of the plurality of predetermined detecting elements in the target area;
generating the output information including second display information acquired by superimposing the densified activity state display image on the facility map image, and
switching an image displayed on the user terminal device from the first display information to the generated second display information.

13. An intra-facility activity analysis method causing an information processing device to perform a processing for performing analysis relevant to an activity state of a moving object on the basis of activity information generated from a captured image acquired by imaging an inside of a facility and generating output information acquired by visualizing the activity state of the moving object, the intra-facility activity analysis method comprising:
acquiring the activity information representing an activity level of the moving object for each of a plurality of predetermined detection elements acquired through division performed on the captured image;
setting a target area on a facility map image acquired by drawing a layout on the inside of the facility;
generating indexed information of the target area, acquired by integrating the activity state of the moving object in the target area on the basis of the activity information for the plurality of predetermined detecting elements in the target area;
generating an activity state display image representing overall activity state of the moving object in the target area on the basis of the indexed information;
generating the output information which includes first display information acquired by superimposing the activity state display image on the facility map image;
displaying the generated first display information, on a display;

receiving an operation for designating densification of the activity state display image by a user, while the first display information is displayed on the display;

in response to receiving the operation for designating densification while the first display information is displayed on the display, generating a densified activity state display image representing the activity state of the moving object in each of the plurality of predetermined detecting elements on the inside of the target area on the basis of the activity information for each of the plurality of predetermined detecting elements in the target area;

generating the output information including second display information acquired by superimposing the densified activity state display image on the facility map image; and switching an image displayed on the display from the first display information to the generated second display information.

* * * * *